US012281430B2

(12) United States Patent
Kim et al.

(10) Patent No.: US 12,281,430 B2
(45) **Date of Patent: *Apr. 22, 2025**

(54) LAUNDRY TREATMENT APPARATUS AND METHOD OF CONTROLLING THE SAME

(71) Applicant: LG Electronics Inc., Seoul (KR)

(72) Inventors: Beomjun Kim, Seoul (KR); Bio Park, Seoul (KR); Sangwook Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,386

(22) Filed: Feb. 13, 2024

(65) Prior Publication Data

US 2024/0183099 A1 Jun. 6, 2024

Related U.S. Application Data

(63) Continuation of application No. 17/373,150, filed on Jul. 12, 2021, now Pat. No. 11,920,282, which is a (Continued)

(30) Foreign Application Priority Data

Aug. 9, 2017 (KR) ........................ 10-2017-0101340

(51) Int. Cl.
*D06F 39/04* (2006.01)
*D06F 37/26* (2006.01)
(Continued)

(52) U.S. Cl.
CPC ............ *D06F 39/04* (2013.01); *D06F 37/267* (2013.01); *D06F 58/26* (2013.01); *H05B 6/102* (2013.01);
(Continued)

(58) Field of Classification Search
CPC ........ D06F 39/04; D06F 37/267; D06F 58/26; D06F 2105/28; D06F 2103/52;
(Continued)

(56) References Cited

FOREIGN PATENT DOCUMENTS

DE 102014208514 A1 * 11/2015 ............. D06F 39/04
EP 2100996 A1 * 9/2009 ......... A47L 15/4285

OTHER PUBLICATIONS

DE102014208514A1—machine translation (Year: 2015).*

* cited by examiner

*Primary Examiner* — Tinsae B Ayalew
(74) *Attorney, Agent, or Firm* — Fish & Richardson P.C.

(57) ABSTRACT

A laundry treatment apparatus is configured to directly heat a drum containing laundry therein. The laundry treatment apparatus includes: a cabinet forming an external appearance of the laundry treatment apparatus; a tub provided in the cabinet; a drum configured to rotate within the tub and to contain laundry therein, the drum being formed of a metallic material; an induction module provided at an outer surface of the tub and configured to heat the drum within the tub via induction by generating a magnetic field; and wherein the outer surface of the tub comprises at least one mounting portion that is configured to mount the induction module, with at least part of the at least one mounting portion being arranged radially closer to a rotational axis of the drum than a remaining portion of the outer surface of the tub.

13 Claims, 20 Drawing Sheets

Related U.S. Application Data continuation of application No. 16/059,302, filed on Aug. 9, 2018, now Pat. No. 11,060,231.

(51) Int. Cl.

| | |
|---|---|
| ***D06F 58/26*** | (2006.01) |
| ***H05B 6/10*** | (2006.01) |
| *D06F 23/04* | (2006.01) |
| *D06F 34/24* | (2020.01) |
| *D06F 37/12* | (2006.01) |
| *D06F 103/52* | (2020.01) |
| *D06F 105/28* | (2020.01) |

(52) U.S. Cl.

CPC ............. *H05B 6/108* (2013.01); *D06F 23/04* (2013.01); *D06F 34/24* (2020.02); *D06F 37/12* (2013.01); *D06F 2103/52* (2020.02); *D06F 2105/28* (2020.02)

(58) Field of Classification Search

CPC .......... D06F 34/24; D06F 23/04; D06F 37/12; H05B 6/102; H05B 6/108

USPC ............................................................... 68/16

See application file for complete search history.

LAUNDRY TREATMENT APPARATUS AND METHOD OF CONTROLLING THE SAME

CROSS-REFERENCE TO RELATED APPLICATIONS

This application is a continuation of U.S. application Ser. No. 17/373,150, filed on Jul. 12, 2021, which is a continuation of U.S. application Ser. No. 16/059,302, filed on Aug. 9, 2018, now U.S. Pat. No. 11,060,231, which claims the benefit of Korean Patent Application No. 10-2017-0101340, filed on Aug. 9, 2017. The disclosures of the prior applications are incorporated by reference in their entirety.

TECHNICAL FIELD

The present invention relates to a laundry treatment apparatus, and more particularly, to a laundry treatment apparatus configured to directly heat a drum containing laundry therein.

BACKGROUND

Generally, laundry treatment apparatuses are apparatuses for treating laundry, specifically, for washing, drying or refreshing laundry.

There are various kinds of laundry treatment apparatuses, for example, a washing machine mainly adapted to wash laundry, a drying machine mainly adapted to dry laundry, and a refresher mainly adapted to refresh laundry.

There is also a laundry treatment apparatus that can perform at least two laundry-treating processes, among washing, drying and refreshing, in a single body. For example, a combined washing and drying machine is a kind of laundry treatment apparatus that can perform all of washing, drying and refreshing in a single body.

Further, there has recently been developed a laundry treatment apparatus that includes two laundry treating bodies, both of which perform washing at the same time, or one of which performs washing and the other of which performs drying simultaneously therewith.

A laundry treatment apparatus may be provided with a heating device for heating wash water or air. The reason for heating wash water to increase the temperature thereof is to promote activation of detergent and breakdown of dirt in order to improve washing performance. The reason for heating air is to evaporate moisture by applying heat to wet laundry in order to dry laundry.

In general, wash water is heated by an electric heater, which is mounted to a tub in which wash water is contained. The electric heater is immersed in wash water, which contains foreign substances or detergent. Thus, foreign substances such as scale may accumulate on the electric heater, which may lead to deterioration in the performance of the electric heater.

Further, in order to heat air, there must be additionally provided a fan for moving air by force and a duct for guiding the movement of air. An electric heater or a gas heater may be used to heat air. However, such an air-heating method has generally poor efficiency.

Recently, there has been developed a drying machine that heats air using a heat pump. A heat pump is a system that uses a cooling cycle of an air-conditioning system in the opposite way, and thus requires the same constituent components as the air-conditioning system, i.e. an evaporator, a condenser, an expansion valve, and a compressor. Different from an air-conditioning system in which a condenser is used as an indoor unit to decrease the indoor temperature, a drying machine having a heat pump dries laundry using air heated by an evaporator. However, a drying machine having such a heat pump has a complicated structure, and the manufacturing costs thereof are high.

An electric heater, a gas heater and a heat pump, which are used as heating devices in various laundry treatment apparatuses, have their own advantages and disadvantages. Laundry treatment apparatuses having new heating devices using induction heating, which can enhance the advantages of the above conventional heating devices and compensate for the disadvantages thereof, are disclosed in Japanese Registered Patent No. 2001070689 and Korean Registered Patent No. 10-922986.

However, these related art documents disclose only a basic concept of induction heating for a washing machine, and do not disclose concrete constituent components of an induction heating module, connection and operational relationships with the constituent components of a laundry treatment apparatus, or a concrete method or configuration for improving efficiency and securing safety.

Various and Concrete Technologies for Improving Efficiency and Securing Safety Need to be Applied to a Laundry Treatment Apparatus Utilizing an Induction Heating Principle.

SUMMARY

Accordingly, the present invention is directed to a laundry treatment apparatus and a method of controlling the same that substantially obviate one or more problems due to limitations and disadvantages of the related art.

An object of the present invention is to provide a laundry treatment apparatus that is capable of improving efficiency and safety while using induction heating.

Another object of the present invention is to provide a laundry treatment apparatus that is capable of realizing soaking treatment or sterilization treatment without completely immersing laundry in wash water.

Still another object of the present invention is to provide a laundry treatment apparatus that is capable of improving washing efficiency and drying laundry by increasing the temperature of the laundry by heating a drum without directly heating wash water.

Yet another object of the present invention is to provide a laundry treatment apparatus that is capable of evenly drying all laundry, improving drying efficiency and shortening the drying time even when the laundry is tangled or even when the amount of laundry is large.

Still yet another object of the present invention is to provide a laundry treatment apparatus that is capable of preventing a short circuit in a coil, which is used to heat a drum, and preventing deformation of the coil.

A further object of the present invention is to provide a laundry treatment apparatus that has a structure for cooling an overheated coil due to the inherent resistance thereof.

Another further object of the present invention is to provide a laundry treatment apparatus that is capable of improving heating efficiency by increasing a coil density (a ratio of the area of the coil to the area of a base housing on which the coil is mounted).

Still another further object of the present invention is to provide a laundry treatment apparatus that is capable of preventing unexpected disengagement of constituent components of an induction module even when a tub vibrates by securing the coupling stability of the induction module.

Yet another further object of the present invention is to provide a laundry treatment apparatus that is capable of preventing the occurrence of noise attributable to a gap by securing the coupling stability of the induction module.

Still yet another further object of the present invention is to provide a laundry treatment apparatus that is capable of improving drying efficiency by evenly heating the front and rear portions of a drum.

A still further object of the present invention is to provide a laundry treatment apparatus that is capable of improving heating efficiency by reducing the interval between a coil of an induction module and a drum and of more stably mounting the induction module on the outer surface of a tub.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, in accordance with one aspect of the present invention, a laundry treatment apparatus comprising: a cabinet forming an external appearance of the laundry treatment apparatus; a tub provided in the cabinet; a drum configured to rotate within the tub and to contain laundry therein, the drum being formed of a metallic material; an induction module provided at an outer surface of the tub and configured to heat the drum within the tub via induction by generating a magnetic field; and wherein the outer surface of the tub comprises at least one mounting portion that is configured to mount the induction module, with at least part of the at least one mounting portion being arranged radially closer to a rotational axis of the drum than a remaining portion of the outer surface of the tub.

The at least one mounting portion may be located at an upper portion of the tub.

A portion of an inner surface of the tub that corresponds to a location of the at least one mounting portion may be arranged radially closer to the rotational axis of the drum than a remaining portion of the inner surface of the tub.

An outer surface of at least one region of the at least one mounting portion may be flat.

The at least one region of the at least one mounting portion may has a rectangular shape.

The at least one region of the cross-section of the at least one mounting portion may comprise a first flat region and a second flat region, and wherein the first flat region and the second flat region of the at least one mounting portion are connected to each other via a connection region that is curved or flat.

The induction module may have a first end and a second end in a circumferential direction that are located over the first flat region and the second flat region of the at least one mounting portion, respectively.

The at least one mounting portion may further comprise: a first connection region that connects a first end of the at least one region of the at least one mounting portion to the remaining portion of the outer surface of the tub; and a second connection region that connects a second end of the at least one region of the at least one mounting portion to the remaining portion of the outer surface of the tub shape.

A center portion of the induction module may be arranged in a plane that includes a rotational axis of the drum and that is perpendicular to the outer surface of the at least one region of the cross-section of the at least one mounting portion.

To achieve these objects and other advantages in accordance with the purpose of the invention, as embodied and broadly described herein, in accordance with one aspect of the present invention, a laundry treatment apparatus comprising: a cabinet forming an external appearance of the laundry treatment apparatus; a tub provided in the cabinet; a drum configured to rotate within the tub and to contain laundry therein, the drum being formed of a metallic material; an induction module provided on an outer surface of the tub and configured to heat the drum within the tub via induction by generating a magnetic field, the induction module comprising a coil extending between a front portion of the tub and a rear portion of the tub and configured to generate the magnetic field, with at least one first portion of the coil arranged to be flat on the outer surface of the tub; and at least one mounting portion provided at the outer surface of the tub and configured to mount the induction module, the at least one mounting portion having an outer surface that is parallel to the at least one first portion of the coil.

The induction module may further comprise a base housing configured to accommodate the coil and within which the coil is wound, the base housing being secured to the outer surface of the tub, with at least part of the base housing being parallel to the at least one mounting portion of the tub.

The coil may be arranged such that a first length thereof along an axial direction of the drum is greater than a second length thereof along a circumferential direction of the drum.

The tub may comprise a first tub portion and a second tub portion that are configured to be coupled by a fastening portion that, in a state in which the first tub portion and the second tub portion are coupled, protrudes outward from the outer surface of the tub by a first distance, and wherein a lower surface of the base housing is configured to be spaced apart from the outer surface of the tub by a second distance that is at least as large as the first distance.

The tub may comprise: a front tub portion surrounding a front portion of the drum; a rear tub portion surrounding a rear portion of the drum; and a coupling portion that connects the front tub portion and the rear tub portion to each other, the coupling portion being formed along a circumferential direction of the tub, wherein, in a state in which the front tub portion is coupled to the rear tub portion and the induction module is mounted on the tub, the induction module is arranged on the outer surface of the tub over the front tub portion and over the rear tub portion.

The base housing may comprise reinforcing ribs protruding downwards from a bottom surface of the base housing and that extend between a gap between the outer surface of the tub and the bottom surface of the base housing, and wherein the reinforcing ribs are configured to be arranged in front of and behind the coupling portion of the tub that protrudes from the outer surface of the tub.

A portion of the coupling portion of the tub that is located under the induction module may comprise: a first coupling rib that protrudes and is bent radially outwards from a first region that is arranged at a first distal portion of any one of the front tub portion or the rear tub portion, the first coupling rib defining an insertion recess configured to accommodate a second distal portion of a remaining one of the front tub portion or the rear tub portion; and a second coupling rib that protrudes radially outwards from a second region that is arranged at the second distal portion of the remaining one of the front tub portion or the rear tub portion, and wherein a first outer surface of the first coupling rib along a radial direction and a second outer surface of the second coupling rib along the radial direction have a same radius.

The first coupling rib may be arranged to couple with the second coupling rib so as to form a space configured to accommodate a rubber packing that is configured to prevent water leakage.

The portion of the coupling portion of the tub, which is located under the induction module, may be arranged above the tub.

At least part of the at least one mounting portion being arranged radially closer to a rotational axis of the drum than a remaining portion of the outer surface of the tub.

An outer surface of at least one region of the at least one mounting portion may be flat.

The features of the above embodiments may be applied in combination with those of other embodiments unless the features are contradictory or mutually exclusive.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Meanwhile, elements or control methods of apparatuses which will be described below are only intended to describe the embodiments of the present invention and are not intended to restrict the scope of the present invention. Wherever possible, the same reference numbers will be used throughout the drawings to refer to the same or like parts.

Figure 1:
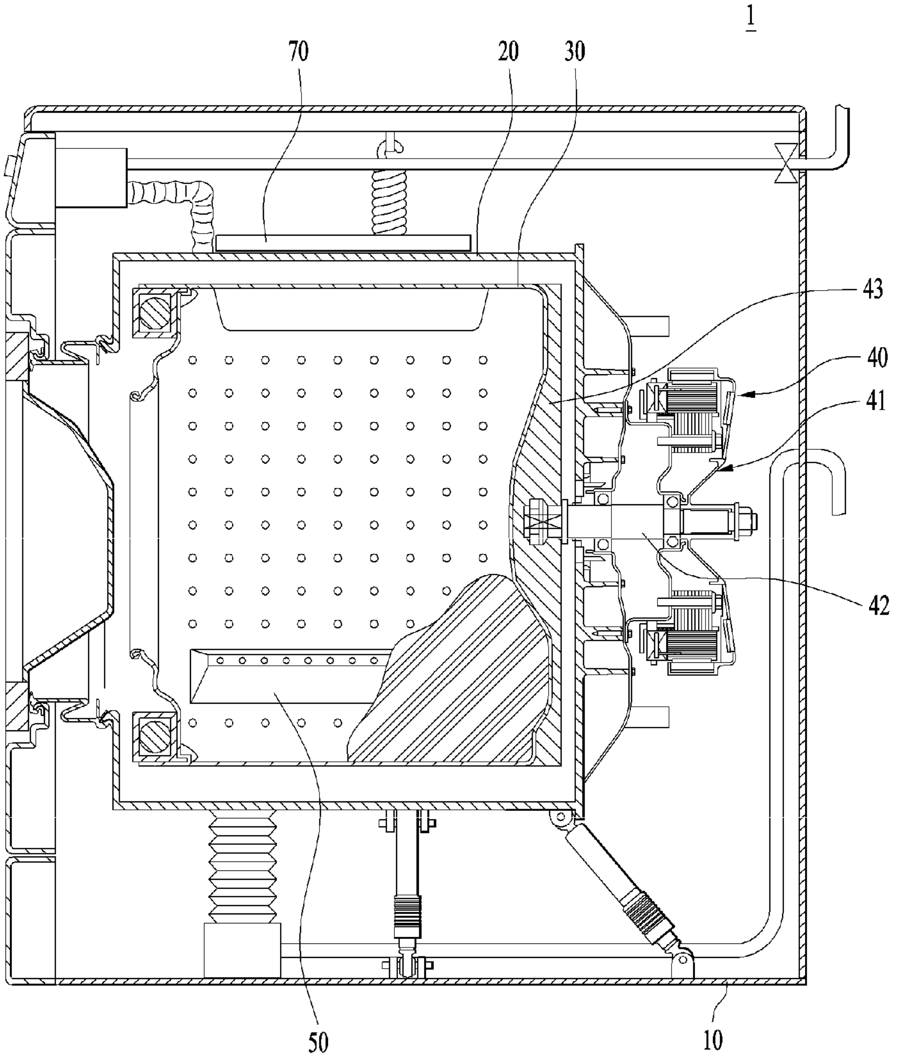
FIG. 1 is a cross-sectional view illustrating a laundry treatment apparatus according to an embodiment of the present invention.

As shown in FIG. 1, a laundry treatment apparatus according to an embodiment of the present invention may include a cabinet 10 forming the external appearance of the laundry treatment apparatus, a tub 20, a drum 30, and an induction module 70 for heating the drum 30.

The tub 20 may be provided in the cabinet 10 to accommodate the drum therein. The tub may be provided in the front side thereof with an opening. The drum 30 is rotatably provided in the tub to contain laundry therein. Similarly, the drum may be provided in the front side thereof with an opening. Laundry can be introduced into the drum through the openings in the tub and the drum.

The induction module 70 may be configured to generate an electromagnetic field to heat the drum. The induction module 70 may be provided on the outer surface of the tub 20. For example, the induction module 70 may be provided on the outer circumferential of the tub 20. The tub 20 provides a certain accommodation space and has an opening formed in the front side thereof. The drum 30 is rotatably installed in the accommodation space in the tub 20 in order to contain laundry therein, and is formed of a conductive material. The induction module is disposed on the outer circumferential surface of the tub 20 to heat the drum 30 using an electromagnetic field.

The tub 20 and the drum 30 may be formed in a cylindrical shape. Accordingly, the inner and outer circumferential surfaces of the tub 20 and the drum 30 may be formed in a substantially cylindrical shape. FIG. 1 shows a laundry treatment apparatus in which the drum 30 is rotated about a rotation axis that is parallel to the ground.

The laundry treatment apparatus may further include a driving unit 40 configured to drive the drum 30 so that the drum 30 rotates inside the tub 20. The driving unit 40 includes a motor 41, and the motor includes a stator and a rotor. The rotor is connected to a rotary shaft 42, and the rotary shaft 42 is connected to the drum 30, whereby the drum 30 can rotate inside the tub 20. The driving unit 40 may include a spider 43. The spider 43 connects the drum 30 and the rotary shaft 42 to each other, and functions to uniformly and stably transmit the rotational force of the rotary shaft 42 to the drum 30.

The spider 43 is coupled to the drum 30 in a manner such that at least a portion thereof is inserted into the rear wall of the drum 30. To this end, the rear wall of the drum 30 is formed in a shape that is recessed toward the interior of the drum. The spider 43 may be inserted into the rear wall of the drum 30 further toward the rotational center portion of the drum 30. Thus, laundry cannot accumulate near the rear end of the drum 30 due to the spider 43.

The drum 30 may be provided therein with a lifter 50. The lifter 50 may be provided in a plural number so as to be arranged in the circumferential direction of the drum. The lifter 50 functions to agitate laundry. For example, as the drum rotates, the lifter 50 lifts laundry up. The laundry lifted up is separated from the lifter and falls due to gravity. The laundry may be washed by the impact caused by the falling thereof. Of course, the agitation of the laundry may also improve drying efficiency.

Laundry may be evenly distributed in the drum in the forward-and-backward direction. Thus, the lifter may be formed so as to extend from the rear end of the drum to the front end thereof.

The induction module is a device for heating the drum 30.

Figure 2:
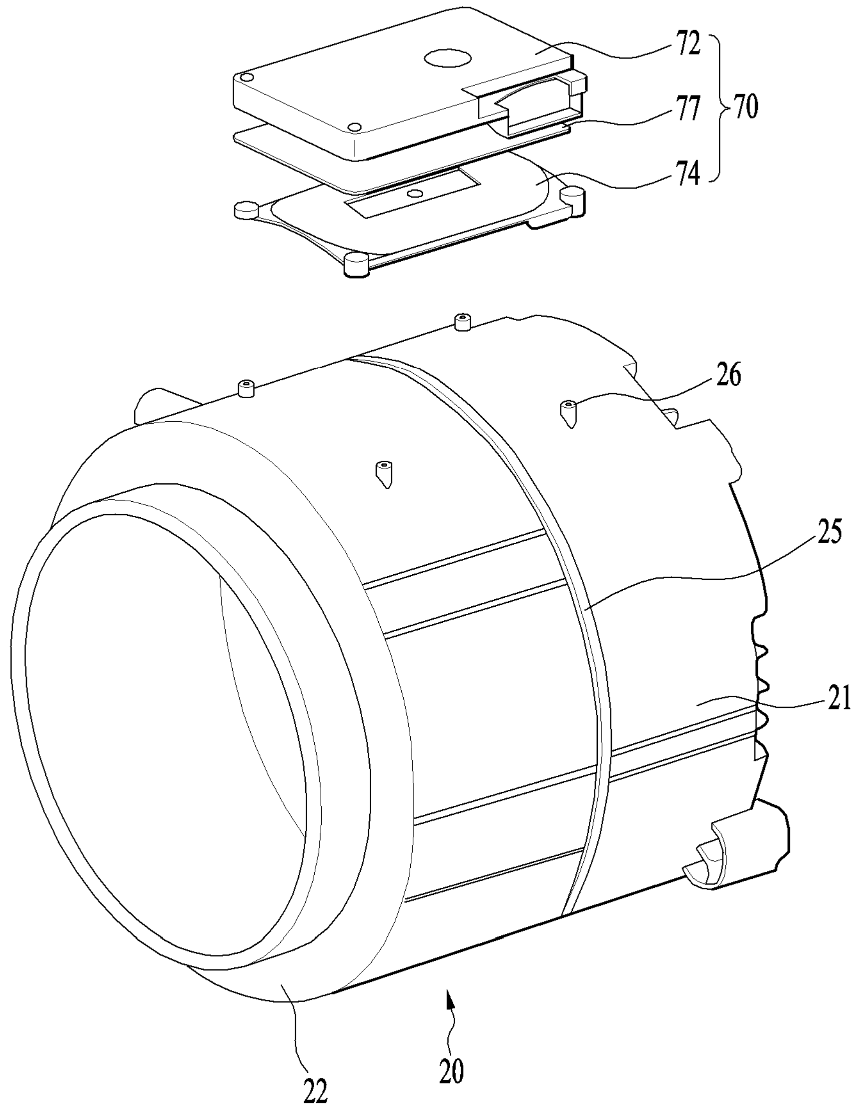
FIG. 2 is an exploded perspective view of a tub and an induction module including a module cover and a base housing.

As shown in FIG. 2, the induction module 70 includes a base housing 74, in which a coil 71 (refer to FIGS. 3 and 4), which receives electric current and generates a magnetic field so that eddy current is generated at the drum, is mounted, and a module cover 72 for accommodating the base housing 74 therein. The coil comprises a wire through which an electric current is configured to pass so as to generate a magnetic field.

The module cover 72 may include a ferromagnetic body. The ferromagnetic body may be a permanent magnet, and may include a ferrite magnet. The module cover 72 may be formed so as to cover the upper portion of the coil 71. Therefore, the ferromagnetic body made of, for example, ferrite, is located above the coil 71.

The coil 71 generates a magnetic field toward the drum 30 that is located thereunder. The magnetic field generated at the upper portion of the coil 71 is not used for heating the drum 30. Thus, it is desirable to focus the magnetic field in the downward direction of the coil 71, rather than in the upward direction of the coil 71. To this end, the ferromagnetic body, such as ferrite, is provided to focus the magnetic field in the downward direction of the coil 71, i.e. toward the drum. Of course, in the case in which the coil 71 is located below the tub 20, the ferromagnetic body, such as ferrite, is located below the coil 71. Therefore, in any case, the coil 71 is located between the ferromagnetic body and the drum 30.

The module cover 72 may be formed in the shape of a box that has one open surface. Specifically, the module cover 72 may have a box shape in which the surface thereof facing the drum is open and the opposite surface thereof is closed. Therefore, the coil 71 is located inside the module cover 72, or the module cover 72 covers the upper portion of the coil 71. The module cover 72 functions to protect the coil 71 from the outside. Further, as will be described later, the module cover 72 functions to cool the coil 71 by forming an air flow path between the module cover 72 and the coil 71.

In the laundry treatment apparatus, the coil 71 can raise the internal temperature in the drum 30 as well as the temperature of the body of the drum 30 by heating the same. The heating of the drum 30 can heat wash water contacting the drum 30 and laundry contacting the inner circumferential surface of the drum 30. Of course, laundry that does not contact the inner circumferential surface of the drum 30 can also be heated by increasing the temperature in the drum. Therefore, the temperature of the wash water, the temperature of the laundry and the atmospheric temperature in the drum can be increased to improve the washing effect, and the temperature of the laundry, the temperature of the drum and the atmospheric temperature in the drum can also be increased to dry the laundry.

Hereinafter, the principle of heating the drum 30 using the induction module 70 including the coil 71 will be described.

A wire is wound to form the coil 71, and accordingly the coil 71 has a center.

When current is supplied to the wire, the current flows around the center of the coil 71 due to the shape of the coil 71. Therefore, a magnetic field is generated in the vertical direction so as to pass through the center of the coil 71.

At this time, when alternating current, the phase of which varies, passes through the coil 71, an alternating current magnetic field, the direction of which varies over time, is formed. The alternating current magnetic field generates an induced magnetic field in a nearby conductor in a direction opposite the alternating current magnetic field, and a change in the induced magnetic field generates induced current in the conductor.

The induced current and the induced magnetic field can be understood as a form of inertia with respect to changes in electric field and magnetic field.

That is, in the case in which the drum 30 is configured as a conductor, eddy current, which is a type of induced current, is generated in the drum 30 due to the induced magnetic field generated in the coil 71.

At this time, the eddy current is dissipated by the resistance of the drum 30, which is a conductor, and is converted into heat. As a result, the drum 30 is heated by the heat generated by the resistance, and the temperature in the drum 30 rises as the drum 30 is heated.

In other words, in the case in which the drum 30 is configured as a conductor that is formed of a magnetic material such as iron (Fe), it can be heated by the alternating current of the coil 71 provided at the tub 20. Recently, in many cases, a drum formed of stainless steel has been used in order to improve strength and hygiene. A stainless steel material has relatively good electric conductivity, and thus may be easily heated by a change in an electromagnetic field. This means that there is no need to specially manufacture a drum having a new configuration or a drum formed of a new material to heat the drum using the induction module 70. Therefore, a drum of the type used in a laundry treatment apparatus of the related art, i.e. a drum that is used in a laundry treatment apparatus employing a heat pump or an electric heater (a sheath heater), can also be used in a laundry treatment apparatus employing an induction module.

The induction module, which includes the coil 71 and the module cover 72, may be provided on the inner circumferential surface of the tub 20. Since the intensity of the magnetic field decreases with distance, it may be effective to provide the induction module on the inner circumferential surface of the tub 20 so as to narrow the gap between the induction module and the drum 30.

However, it is desirable for the induction module to be provided on the outer circumferential surface of the tub 20 for safety because the tub 20 contains wash water therein and vibrates as the drum 30 rotates. Because the interior of the tub is very humid, it may be undesirable for the induction module to be provided on the inner circumferential surface of the tub in view of the insulation and stability of the coil. Therefore, as shown in FIGS. 1 and 2, it is desirable for the induction module 70 to be provided on the outer circumferential surface of the tub 20. Also in this case, however, it is desirable that the gap between the induction module 70 and the outer circumferential surface of the drum be made as small as possible. A preferred embodiment for this will be described later.

Generally, in the laundry treatment apparatus, the tub 20 has a cylindrical shape because the drum 30 rotates to wash or dry clothes (hereinafter, referred to as 'laundry').

At this time, the coil 71 may be provided so as to be wound around the entire outer circumferential surface of the tub 20 at least once.

However, if the coil 71 is wound around the entire circumference of the tub 20, it requires too much wire. In addition, a short circuit or other problems may occur due to contact between the coil and the wash water leaking from the tub 20.

Further, if the coil 71 is wound around the entire circumference of the tub 20, an induced magnetic field may be generated in the opening 22 in the tub 20 and the driving unit 40, and thus may fail to directly heat the outer circumferential surface of the drum 30.

Therefore, it is desirable for the coil 71 to be provided only on a portion of the outer circumferential surface of the tub 20. That is, the coil 71 may be provided so as to be wound around a certain region from the front side of the tub 20 to the rear side thereof at least once, rather than being wound around the entire outer circumferential surface of the tub 20.

This configuration is determined not only in consideration of the heat generation efficiency in the drum 30, which can be achieved by the output of the induction module 70, but also in consideration of the overall manufacturing efficiency of the laundry treatment apparatus on the basis of the size of a space between the tub 20 and the cabinet 10.

The coil 71 may be formed to have a single-layer structure. That is, the wire may be wound in a single layer, rather than in multiple layers. In the case in which the wire is wound in multiple layers, a gap is inevitably formed between adjacent portions of the wire. That is, a gap is inevitably formed between a portion of the wire that is located in the bottom layer and a portion of the wire that is located in the top layer. Therefore, the distance between the portion of the coil that is located in the top layer and the drum is increased. Of course, even if such a gap can be physically eliminated, the greater the number of layers of the coil, the longer the distance between the portion of the coil that is located in the top layer and the drum, which leads to deterioration in efficiency.

Therefore, it is highly desirable for the coil 71 to be formed in a single layer. This also means that it is possible to increase the contact area between the coil and the drum as much as possible while using the wire having the same length. Meanwhile, it is desirable that the coil 71 be formed so as to occupy the maximum allowable area within a given area of the base housing 72. That is, it is desirable to increase the coil density. The coil is formed in a manner such that the wire is wound in a closed loop. At this time, the wire must not be folded. However, it is not easy to wind the wire so that the area of the coil is maximized while preventing the wire from being folded. An embodiment capable of maximizing the area of the coil while preventing the wire from being folded sharply will be described later.

In FIG. 1, the induction module is illustrated as being provided on the upper portion of the tub 20. However, the present invention is not limited thereto. The induction module may be provided on at least one of the upper portion, the lower portion, and both side portions of the tub.

The induction module may be provided on a portion of the outer circumferential surface of the tub, and the coil 71 may be wound around the surface of the induction module that is adjacent to the tub 20 at least once within the induction module.

Thus, the induction module directly radiates an induced magnetic field to the outer circumferential surface of the drum 30, thereby generating eddy current in the drum 30 and consequently directly heating the outer circumferential surface of the drum 30.

Although not illustrated, the induction module may be connected to an external power source via an electric wire to receive power, or may be connected to a controller for controlling the operation of the laundry treatment apparatus to receive power. A module control unit for controlling the output of the induction module may be separately provided. The module control unit may be configured to control the ON/OFF operation of the induction module and the output of the induction module under the control of the controller.

That is, as long as power can be supplied to the coil 71, the induction module may receive power from any device.

When power is supplied to the induction module and thus alternating current flows through the coil 71 provided in the induction module, the drum 30 is heated.

At this time, if the drum 30 is not rotated, only a portion of the drum 30 is heated, with the result that the portion of the drum 30 may be overheated and the remaining portion thereof may not be heated, or may be insufficiently heated. Further, heat may not be smoothly transferred to the laundry contained in the drum 30.

For this reason, when the induction module is operated, the driving unit 40 operates to rotate the drum 30.

As long as the entire outer circumferential surface of the drum 30 can face the induction module, the drum 30 may be rotated at any speed by the driving unit 40.

As the drum 30 rotates, the entire surface of the drum 30 can be heated, and the laundry in the drum 30 can be evenly exposed to heat.

Therefore, in the laundry treatment apparatus according to an embodiment of the present invention, even though the induction module is not mounted on a plurality of portions (e.g. the upper portion, the lower portion, both side portions, etc.) of the outer circumferential surface of the tub 20 but is mounted only on one portion, the outer circumferential surface of the drum 30 can be evenly heated.

In the laundry treatment apparatus according to an embodiment of the present invention, the drum may be heated to 120 degrees Celsius or higher within a very short time by the operation of the induction module 70. If the induction module 70 is driven while the drum is in a stationary state or is rotated at a very low speed, a specific portion of the drum may be overheated very quickly. This is because heat is not sufficiently transferred from the heated drum to laundry.

Therefore, the relationships between the rotational speed of the drum and the operation of the induction module 70 are very important. It is more desirable to drive the induction module after the drum starts to rotate than to rotate the drum after the induction module starts to be driven.

In the laundry treatment apparatus of an embodiment of the present invention, it is not necessary for the laundry to be completely soaked in the wash water, and thus wash water can be saved. The reason for this is that the portion of the drum that contacts the wash water continuously changes as the drum rotates. That is, the heated portion of the drum comes into contact with the wash water to heat the wash water, and is then separated from the wash water and heated again.

In the laundry treatment apparatus according to an embodiment of the present invention, it is possible to increase the temperature of the laundry and the temperature in the space containing the laundry therein. This can be realized by heating the drum that contacts the laundry. Therefore, it is possible to effectively heat the laundry without immersing the laundry in wash water. For example, wash water can be saved because the laundry does not need to be immersed in the wash water for sterilization treatment. This is because the laundry can receive heat through the drum, rather than through the wash water. In addition, steam or water vapor generated as the wet laundry is heated changes the interior of the drum into a high-temperature and high-humidity environment, whereby the sterilization treatment can be more effectively performed. Therefore, the sterilizing-washing process, in which laundry is washed while being immersed in the heated wash water, can be realized by a method using a much smaller amount of wash water. In other words, since it is not necessary to heat wash water, which has a high specific heat, energy can be saved.

It will be understood that the laundry treatment apparatus according to an embodiment of the present invention is capable of reducing the amount of wash water to be supplied in order to increase the temperature of laundry, thus shortening the wash water supply time. This is because it is possible to reduce the amount and supply time of wash water that is additionally supplied after laundry wetting. Therefore, the washing time can be further shortened. Here, the water level of the wash water containing detergent may be lower than the minimum water level of the drum. In this case, a smaller amount of wash water can be more effectively used by supplying the wash water in the tub to the interior of the drum through a circulation pump.

It will be understood that the laundry treatment apparatus according to an embodiment of the present invention is capable of eliminating a heater provided on the lower side of the tub to heat wash water, thus simplifying construction and increasing the volume of the tub. A general heater provided inside the tub is limited in the extent to which the same is capable of increasing the heating surface area. That is, the surface area of the heater, which contacts air or laundry, is relatively small. On the other hand, the surface area of the drum or the surface area of the circumferential surface of the drum is very large. Accordingly, the heating area is increased, and thus an immediate heating effect can be obtained.

In the heating mechanism using a tub heater during the washing process, the tub heater heats wash water, and the heated wash water increases the temperature of the drum, the temperature of the laundry, and the atmospheric temperature in the drum. Therefore, it takes a lot of time for the above components to be heated to a high temperature. In addition, when the wash water is heated during the washing process, the operation of the drum is generally stopped. The reason for this is to drive the tub heater submerged in the wash water in the state in which the water level is stable. Thus, the washing time may be increased by the time required for heating the wash water.

However, according to the embodiment of the present invention, the surface area of the circumferential surface the drum that contacts wash water, laundry, and air in the drum is relatively very large. Thus, the heated drum directly heats wash water, laundry, and air in the drum. Therefore, the induction module is a more effective heating source for washing than the tub heater. The heating of the wash water using the induction module may be performed while the drum is being driven. That is, the operation of the drum for washing and the heating of wash water may be performed at the same time. Therefore, no additional time is required for heating wash water, thus minimizing an increase in the washing time.

Hereinafter, a concrete configuration and an embodiment of the induction module of the laundry treatment apparatus of the present invention will be described.

First, a configuration for adjusting the direction of a magnetic field that is generated in the coil will be described with reference to FIGS. 2 to 4.

Generally, the laundry treatment apparatus includes a controller (not shown) for rotating the driving unit 40, manipulating a control panel (not shown) provided in the cabinet 10 and controlling the processes of the laundry treatment apparatus, and further includes various electric wires (not shown).

The induction module 70 serves to heat the drum 30 using the magnetic field radiated from the coil 71. However, in the case in which the controller and the electric wires provided in the laundry treatment apparatus are exposed to the magnetic field radiated from the coil 71, abnormal signals may be generated in the controller and the electric wires.

Further, because the electronic devices, such as the controller, the electric wires, the control panel, etc., are susceptible to a magnetic field, it is desirable that only the drum 30 be exposed to the magnetic field generated by the induction module. Therefore, it is highly desirable that no conductor be provided between the coil 71 of the induction module 70 and the drum 30.

Further, since the generated magnetic field must be used only for heating the drum, it is highly desirable that the magnetic field be focused in the direction toward the drum (e.g. in the downward direction of the coil).

To this end, the induction module 70 may further include a blocking member 77 so that the magnetic field generated by the coil 71 is focused only on the drum 30. That is, the blocking member 77 may be provided on the coil 71 so that the magnetic field is focused in the direction toward the drum.

The blocking member 77 may be formed of a ferromagnetic material in order to focus the magnetic field generated by the coil 71 in the direction toward the drum.

The blocking member 77 may be coupled to the upper side of the base 74, and may be attached or mounted to the inner surface of the module cover 71. The blocking member 77 may be formed in a flat plate shape. In addition, a portion of the module cover 72 may be formed of a ferromagnetic material to serve as the blocking member.

That is, since the module cover 72 is formed in the shape of a box that has one open surface, in the case in which the module cover 72 accommodates the coil 71 or the base 74 therein, it can focus the magnetic field in the direction toward the drum 30. In this case, the additional blocking member 77 may be omitted.

Meanwhile, the blocking member 77 may be a permanent magnet such as ferrite. The ferrite may not be formed so as to cover the entire upper portion of the coil 71. That is, the ferrite may be formed so as to cover only a portion of the coil, like the coil-fixing portion shown in FIGS. 3 and 4. This means that the ferrite bar magnet can be fixed to the coil-fixing portion. That is, a permanent magnet made of, for example, ferrite, may be provided perpendicular to the longitudinal direction of the coil so as to focus the magnetic field in a desired direction. Therefore, it is possible to greatly improve efficiency using a small amount of ferrite. A concrete embodiment of the ferrite will be described later.

Although not illustrated, the controller may adjust the amount of current that flows through the coil 71, and may supply current to the coil 71.

The controller (not shown) may further include at least one of a thermostat (not shown) or a thermistor (not shown) in order to interrupt the supply of current to the coil when an excessive amount of current is supplied to the coil or when the temperature of the coil rises above a predetermined value. That is, a temperature sensor may be included. The thermostat and the thermistor may be provided in any shape, as long as they can interrupt the supply of current to the coil 71.

Hereinafter, the relationships between the coil 71 and the permanent magnet 75 will be described in detail with reference to FIGS. 3 and 4.

The permanent magnet 75 may be provided to focus the magnetic field generated by the coil 71 in the direction toward the drum 30 in order to improve efficiency. The permanent magnet may be formed of a ferrite material. Specifically, the permanent magnet 75 may be provided in the form of a bar magnet that is perpendicular to the winding direction of the coil 71 or the longitudinal direction of the coil 71. The permanent magnet may be formed so as to form an intrinsic magnetic field in the upward-and-downward direction. Specifically, the permanent magnet may be formed so that the magnetic field is formed in the direction toward the drum.

Figure 3:
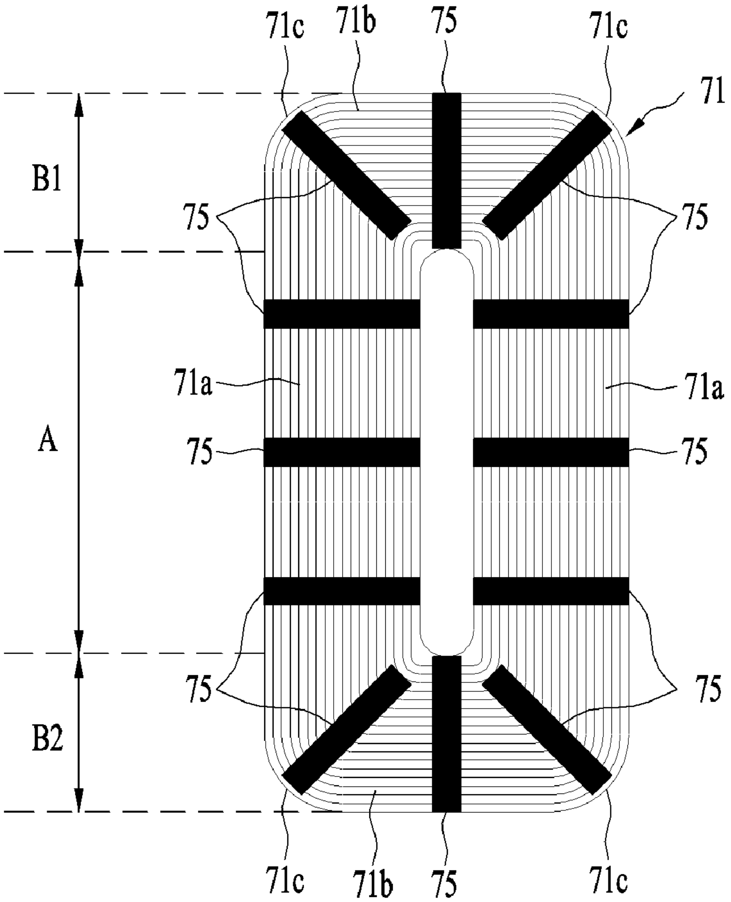
FIG. 3 is a plan view showing an example of position relationships between a coil and a permanent magnet.
Figure 4:
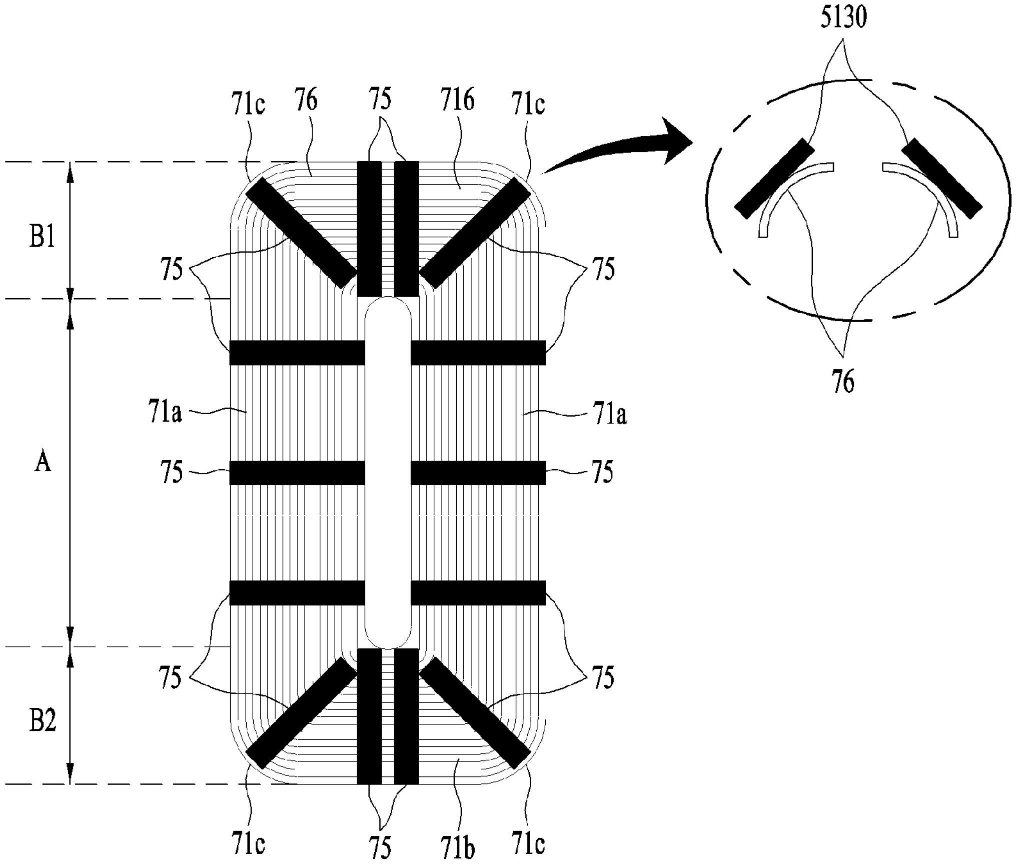
FIG. 4 is a plan view showing another example of position relationships between a coil and a permanent magnet.

FIGS. 3 and 4 are plan views of the coil 71 in which a wire 76 is wound around a certain region on the outer circumferential surface of the tub 20. The permanent magnet 75 is also illustrated as being provided on the top surface of the coil 71.

As illustrated, the permanent magnet 75 may be configured as a bar magnet, and may be located on the coil 71 while being arranged perpendicular to the longitudinal direction of the coil 71. This is for covering both an inner coil portion located at a radially inward position and an outer coil portion located at a radially outward position at the same time.

The permanent magnet 75 may be provided in a plural number, and the plurality of permanent magnets 75 may be bar magnets that are the same size as each other. The permanent magnets 75 may be arranged so as to be spaced apart from each other in the longitudinal direction of the coil 71.

In the case in which the permanent magnets 75 are disposed at specific positions, the amount of the magnetic field radiated to the drum 30 is different for each portion of the circumferential surface of the drum 30, and thus it is difficult to evenly heat the drum. Therefore, in order to evenly induce the magnetic field generated by the coil 71 in the direction toward the drum 30, it is desirable that the permanent magnets 75 be arranged so as to be spaced apart from each other with a constant interval or a constant pattern along the circumference of the coil 71.

Further, in the case in which the number of permanent magnets 75 used for each portion of the coil 71 is the same, it is desirable that the permanent magnets 75 be densely disposed on the portions of the coil 71 that are adjacent to the front and rear sides of the tub 20.

Specifically, the coil 71 may be sectioned into both end portions B11 and B2, which include a front end portion B1 located adjacent to the front side of the tub 20 and a rear end portion B2 located adjacent to the rear side of the tub 20, and an intermediate portion A, which is located between the front end portion B1 and the rear end portion B2 and has a larger area than the front end portion B1 and the rear end portion B2. The permanent magnets 75 may be arranged such that the number thereof disposed on the front end portion B1 or the rear end portion B2 of the coil is equal to or greater than that disposed on the intermediate portion A of the coil.

The density of the coil 71 in the intermediate portion A is relatively large. On the other hand, the density of the coil 71 in the both end portions B1 and B2 is relatively small. The density of the coil is inevitably reduced in the both end portions B1 and B2 due to the rounded corners. The reason for this is that the coil cannot be theoretically bent at a right angle at the corners.

Therefore, relatively less concentration of the magnetic field is required for the intermediate portion A of the coil, and relatively greater concentration of the magnetic field is required for the both end portions B1 and B2 of the coil.

Thus, in the case in which the number of permanent magnets used for each portion of the coil is the same, it is desirable that the permanent magnets be more densely disposed on the both end portions of the coil than on the intermediate portion of the coil. Accordingly, it is possible to evenly heat the front and rear sides of the drum. That is, the embodiment shown in FIG. 4 can further improve efficiency by more evenly heating the drum than the embodiment shown in FIG. 3.

In other words, the magnetic flux density in the both end portions B1 and B2 of the coil is increased through the dense arrangement of the permanent magnets, with the result that the drum 30 is evenly heated in the longitudinal direction thereof.

Specifically, under the same conditions, the embodiment shown in FIG. 4 may be more efficient than the embodiment shown in FIG. 3. Further, assuming that the number of permanent magnets used for each portion of the coil is the same, it may be desirable to move the permanent magnets located in the intermediate portion A of the coil to positions adjacent to the both end portions B1 and B2 of the coil in terms of efficiency. Therefore, in the case in which the total magnetic flux density is determined through the permanent magnets, it is desirable that the magnetic flux density in the both end portions of the coil be set to be larger than the magnetic flux density in the intermediate portion of the coil.

The above-described embodiment related to the winding form of the coil 71 and the above-described embodiment related to the arrangement of the permanent magnets 75 can be applied to a single laundry treatment apparatus without any contradiction. That is, it is possible to obtain the effect of more evenly heating the drum 30 when the above-described embodiment related to the winding form of the coil and the above-described embodiment related to the arrangement of the permanent magnets are combined, compared with when these embodiments are implemented individually.

The coil 71 may be formed in any shape, such as a concentric circle, an ellipse, a track, etc., as long as the coil 71 can be formed on the outer circumferential surface of the tub 20 by winding the wire 76. However, the extent to which the drum 30 is heated may vary depending on the wire-winding shape. This has been described above.

Figure 6:
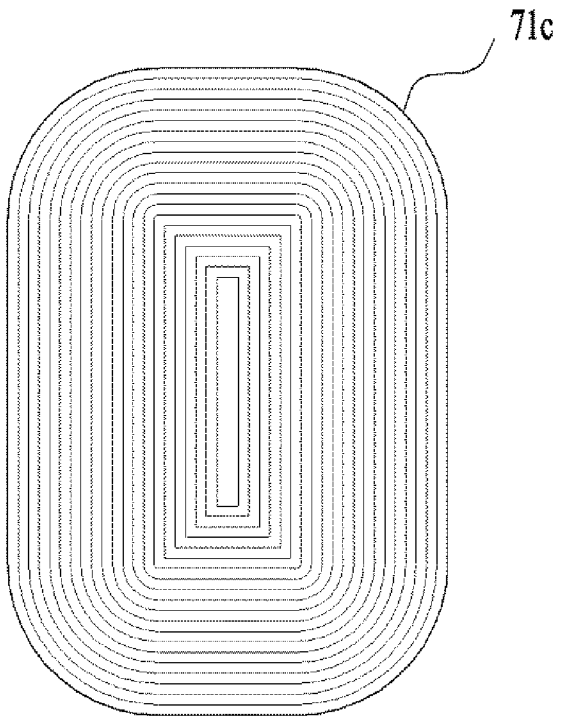
FIG. 6 is a plan view showing an example of a track-shaped coil in which a ratio of the longitudinal width to the lateral width is relatively small.

For example, like the coil shown in FIG. 6, in the case in which the radius of curvature of the curved portion of the coil is different between the inner coil portion located at the radially inward position and the outer coil portion located at the radially outward position, the amount of the magnetic field transferred to the center of the drum 30 and the amount of the magnetic field transferred to the front and rear sides of the drum 30 may be significantly different from each other.

In other words, because the area of the coil that is located near the front and rear sides of the drum 30 is relatively small, the amount of the magnetic field that is transferred to the front side of the circumferential surface of the drum 30 is relatively small. On the other hand, because the area of the coil that is located near the center of the drum 30 is relatively large, the amount of the magnetic field that is transferred to the center of the circumferential surface of the drum 30 is relatively large. Therefore, it is difficult to evenly heat the drum 30.

Therefore, it is desirable for the coil to be formed in a rectangular shape, rather than a square shape. That is, it is desirable that the width in the forward-and-backward direction of the coil be greater than the width in the lateral direction thereof. Accordingly, it is possible to expand the center portion of the coil, which has a relatively large area, in the direction from the center of the drum to the front and rear ends of the drum.

Figure 5:
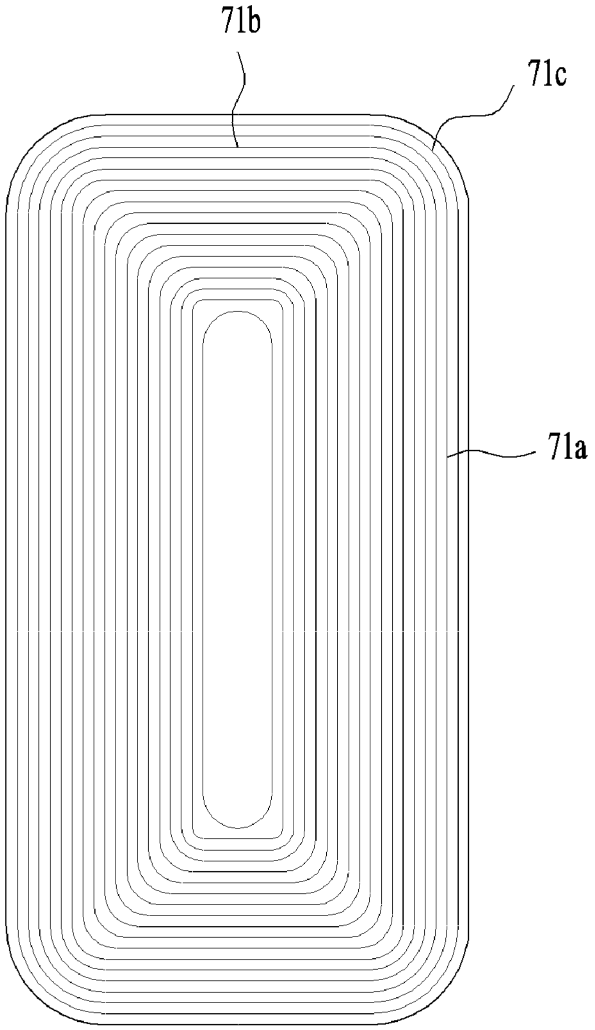
FIG. 5 is a plan view showing an example of a track-shaped coil in which a ratio of the longitudinal width to the lateral width is relatively large.

As shown in FIGS. 3 to 5, the wire 76 may be wound such that the coil 71 includes straight portions 71*a* and 71*b* and a curved portion 71*c*. In the curved portion 71*c*, the inner coil portion and the outer coil portion may have the same radius of curvature as each other. That is, it is desirable that the radius of curvature of the wire at a position close to the center of the coil and the radius of curvature of the wire at a position distant from the center of the coil be the same. The radius of curvature in the straight portions 71*a* and 71*b* is meaningless, and thus the same radius of curvature is meaningful in the curved portion 71*c*. In the case of FIG. 6, the radius of curvature in the curved portion 71*c* is different for each portion of the coil located in the radial direction. Specifically, in the case of FIG. 6, the radius of curvature in the curved portion 71*c* is gradually increased in the radially outward direction.

It can be seen that the area of the corner portion of the coil shown in FIG. 5 and the area of the corner portion of the coil shown in FIG. 6 are significantly different from each other.

The relationships between the straight portions 71*a* and 71*b* and the curved portion 71*c* will now be described in more detail with reference to FIGS. 3 and 4. The straight portions 71*a* and 71*b* include a front straight portion 71*b* located on the front side of the outer circumferential surface of the tub 20 and a rear straight portion 71*b* located on the rear side of the outer circumferential surface of the tub 20, which are collectively referred to as horizontal (lateral) straight portions, and further includes a vertical (longitudinal) straight portion 71*a*, which is formed perpendicular to the horizontal straight portions 71*b*. It is desirable that the length of the vertical straight portion be greater than the length of the horizontal straight portion. That is, in the case in which the coil is formed in an elliptical shape or a track shape, it is desirable that the long axis of the coil be formed in the forward-and-backward direction of the tub.

The curved portion 71*c* is formed at the position at which the horizontal straight portion 71*b* and the vertical straight portion 71*a* meet. That is, the coil may be formed by four curved portions 71*c*, which have the same radius of curvature as each other, and four straight portions.

Through the above-described configuration, the both end portions B1 and B2 of the coil, which include the front end portion located adjacent to the front side of the tub 20 and the rear end portion located adjacent to the rear side of the tub 20, and the intermediate portion A of the coil, which is located between the front end portion B1 and the rear end portion B2, may have uniform lateral widths. In addition, the curved portion may be formed such that the inner coil portion and the outer coil portion have the same radius of curvature as each other, with the result that the curved portion may be formed so as to maximally approximate to the shape of the corner of a rectangle. In other words, a first radius of curvature of an inner coil portion of the curved portion of the coil being the same as a second radius of curvature of an outer coil portion of the curved portion of the coil.

As a result, the amount of the magnetic field radiated from the both end portions B1 and B2 of the coil to the front and rear portions of the circumferential surface of the drum 30 can be set as close as possible to the amount of the magnetic field radiated from the intermediate portion A of the coil to the center of the circumferential surface of the drum 30. That is, the amount of the magnetic field, which may be reduced at the both end portions of the coil due to the shape thereof, can be compensated for as much as possible through the uniform radius of curvature in the curved portion.

Therefore, it is possible to obtain the effect of evenly heating the center and the front and rear portions of the circumferential surface of the drum 30.

This uniform heating, which can be achieved through the above-described shape of the coil and the uniform radius of curvature in the curved portion, may be more effectively performed through magnetic field concentration using the above-described ferrite. That is, the magnetic field may be further focused on the front and rear sides of the drum than on the center of the drum by the ferrite. In other words, the magnetic field that is excessively focused on the center of the drum may be dispersed to the front and rear sides of the drum. This dispersion method is very economical and effective. In the case in which the amount of the magnetic field that can be focused by the ferrite is determined, the arrangement of the ferrite may be appropriately concentrated on the regions corresponding to the front and rear ends of the drum.

Figure 7:
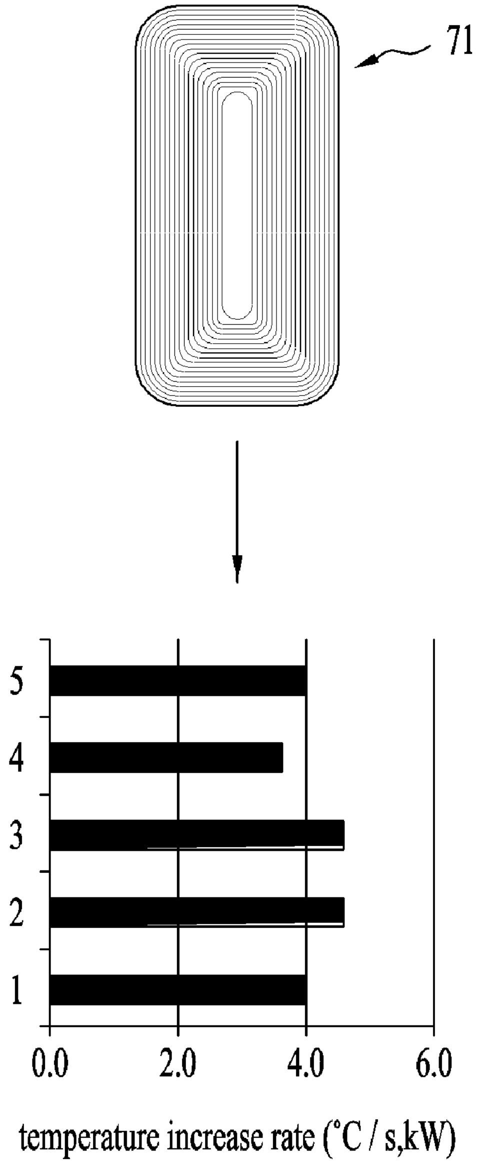
FIGS. 7 to 9 are views showing temperature rise rates in the forward-and-backward longitudinal direction of a drum with respect to three different coils.
Figure 8:
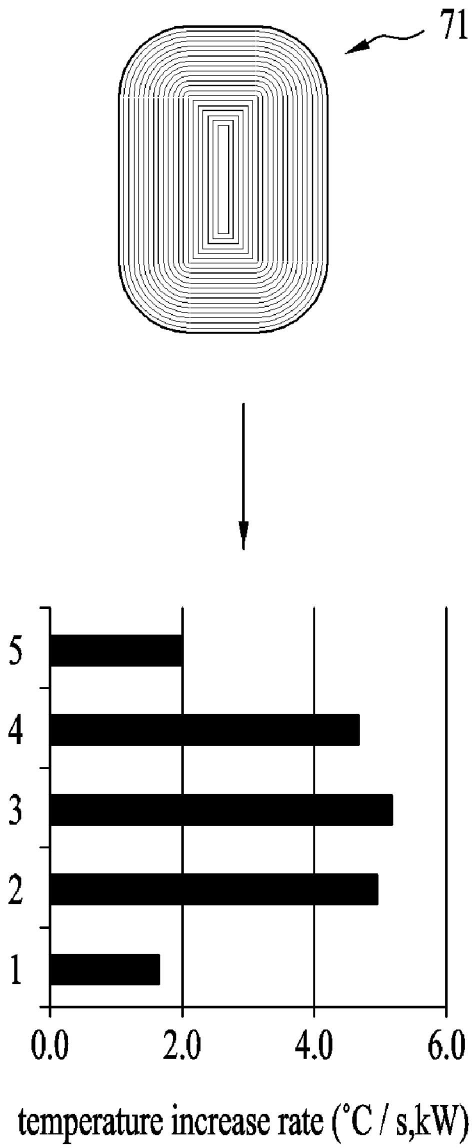
Figure 9:
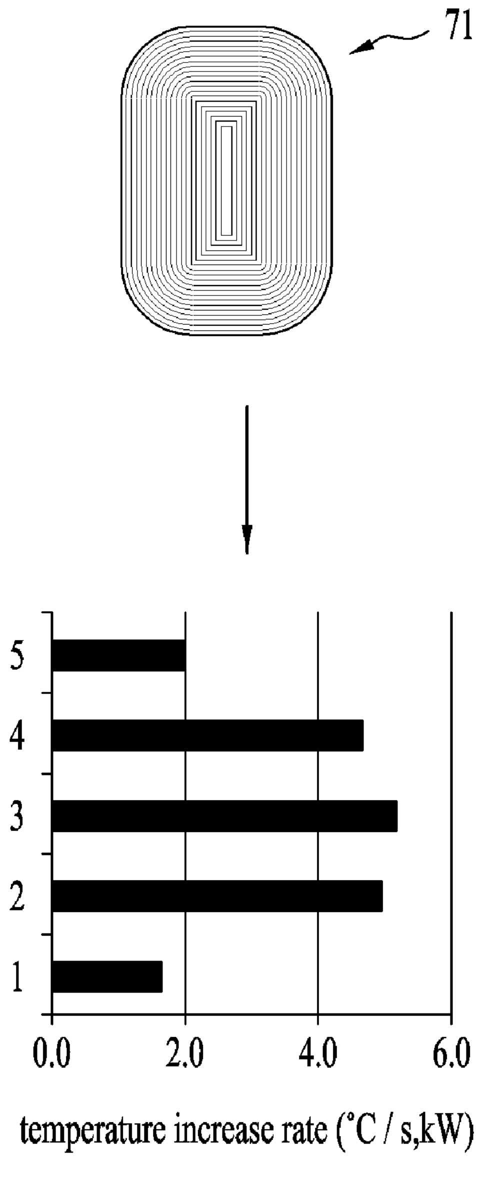

FIGS. 7 to 9 show coils 71 having different vertical lengths from each other and the temperature rise distribution of the circumferential surface of the drum 30 depending on the longitudinal widths of the coils 71.

In the graph, the vertical axis represents portions of the outer circumferential surface of the drum 30. Here, '1' denotes the rear portion of the outer circumferential surface of the drum 30, '5' denotes the front portion of the outer circumferential surface of the drum 30, and '2' to '4' denote the portions between the rear portion of the outer circumferential surface of the drum 30 and the front portion thereof. The horizontal axis represents the temperature rise rate of the drum 30.

Hereinafter, the longitudinal width of the coil 71 and the temperature rise rate of the drum 30 will be described through comparison of the coils 71 shown in FIGS. 7 to 9. FIG. 7 shows the case in which the drum is heated using the coil having the largest longitudinal width, FIG. 8 shows the case in which the drum is heated using the coil having a medium longitudinal width, and FIG. 9 shows the case in which the drum is heated using the coil having the smallest longitudinal width.

In the case of the coil of FIG. 7, the temperature rise rate is substantially uniform over the front and rear portions and the center of the drum 30. In the case of the coil of FIG. 9, the temperature rise rate is significantly different between the front and rear portions of the drum 30 and the center of the drum 30. In the case of the coil of FIG. 8, the temperature rise rate is somewhat different between the front and rear portions of the drum 30 and the center of the drum 30.

That is, on the assumption that the area of the coil 71 is uniform, the front and rear portions and the center of the drum 30 can be more evenly heated as the longitudinal width of the coil 71 becomes longer. This can be realized by expanding a large portion of the coil from the region corresponding to the center of the drum to the regions corresponding to the front and rear portions of the drum.

An analysis of the relationships between the area or shape of the coil and the efficiency with which electric energy is converted into thermal energy will be described with reference to FIG. 7.

First, in the case in which the area of the coil is uniform, that is, the case in which the coil is formed using a piece of wire having a uniform length, the efficiency with which electric energy is converted into thermal energy increases as the shape of the coil more closely approximates a circle or a square. The reason for this is that the closer the center of the magnetic field is to a single axis (line), the smaller the amount of magnetic field that leaks.

However, it is not desirable to mount a circular- or square-shaped coil on the cylindrical-shaped tub in terms of convenience of mounting and mounting stability. This is because the lateral width of the coil is increased, which means that the angle between the left end and the right end of the coil is increased. The increase in the angle between the left end and the right end of the coil means that the coupling error between the cylindrical-shaped tub and the left and right ends of the coil is inevitably increased. Therefore, it is desirable that the angle between the left end and the right end of the coil be substantially less than 30 degrees about the center of the tub.

FIGS. 8 and 9 show coils having the same lateral width as each other. The lateral width of the coil is set to be uniform for mounting stability and convenience. FIG. 9 shows an example of maximizing the lateral width of the coil in order to maximize the energy conversion efficiency. However, since the extension of the lateral width of the coil is limited, the width in the forward-and-backward direction of coil is inevitably reduced. This means that the area expansion of the coil is limited and the front and rear portions of the drum cannot be sufficiently heated. Therefore, only some of the laundry in the drum is heated, but the rest of the laundry is not heated. Accordingly, drying efficiency is significantly lowered.

In view of this problem, there may be provided the coil of FIG. 8, of which the width in the forward-and-backward direction thereof is increased while maintaining the lateral width thereof. In this case, the area of the coil is increased so that the front and rear portions of the drum can also be heated, and thus the overall temperature rise rate increases.

The coil of FIG. 7 is an example in which the width in the forward-and-backward direction thereof is increased instead of reducing the area of a center portion thereof and the lateral width thereof as compared with the coil of FIG. 8. As illustrated, the temperature rise rate at the center of the drum is slightly reduced, but the temperature rise rate at the front and rear ends of the drum is increased. That is, it can be seen that the temperature rise rate is substantially uniform over the front and rear portions and the center of the drum.

It can be seen that although the energy conversion efficiency is the lowest due to the increase in the width in the forward-and-backward direction of the coil and the decrease in the area of the center portion of the coil, the coil of FIG. 7 is the most desirable one in terms of uniform heating of the drum.

As described above, although energy conversion efficiency is important, drying efficiency is more important when the energy conversion efficiency is not greatly different. That is, it is more important to evenly heat the drum so that the laundry is evenly dried irrespective of the location thereof in the drum. Generally, a drying process is performed until a desired degree of dryness for each piece of laundry is satisfied. In the case in which a drying process is performed by sensing the degree of dryness, when a specific piece of laundry is not dried, the drying process is performed until a desired degree of dryness for the specific piece of laundry is satisfied and consequently until a desired degree of dryness for all of the laundry is satisfied.

It can be said that the shorter the time required for satisfying the same degree of dryness, i.e. the drying time, the higher the drying efficiency. A reduction in the drying time means energy savings.

Therefore, even if the efficiency of the induction module is lowered, it is more desirable that the energy consumption of the laundry treatment apparatus be low. From this point of view, the present applicant has found that the coil of FIG. 7 is the most efficient when not only the efficiency of the induction module but also the overall efficiency of the laundry treatment apparatus is considered.

In the case in which a portion of the wire that is located at the outermost position of the horizontal straight portion 71*b* is expanded to the front and rear portions of the tub 20, the drum 30 may be more evenly heated. In this case, however, the magnetic field is excessively radiated in the forward-and-backward direction and heats the driving unit 40, the door, or other components of the laundry treatment apparatus, thus leading to damage to the laundry treatment apparatus. Further, since unnecessary components may also be heated, efficiency may be lowered. Therefore, the increase in the length or width in the forward-and-backward direction of the coil or the induction module needs to be limited.

In the case of a laundry treatment apparatus in which the rear portion of the tub 20 is inclined inside the cabinet 10, when the tub 20 vibrates upwards and downwards, the front upper edge of the induction module 70 interferes with the bottom surface of the top panel of the cabinet, which causes damage to the induction module 70 and the cabinet 10. In order to prevent this problem, the height of the cabinet 10 may be increased. In this case, however, a compact laundry treatment apparatus cannot be realized.

Thus, a portion of the wire that is located at the outermost position of the front straight portion 71*b* and a portion of the wire that is located at the outermost position of the rear straight portion 71*b* are spaced apart from the front side of the tub 20 and the rear side of the tub 20, respectively, by a predetermined distance. The predetermined distance may range from 10 mm to 20 mm.

The above-described configuration has effects of preventing unnecessary heating of components other than the drum 30 or interference between the induction module 70 and the bottom surface of the top panel of the cabinet 10 and of evenly heating the outer circumferential surface of the drum 30.

Further, the length of a portion of the wire that is located at the outermost position of the vertical straight portion 71*a* of the coil 71 may be greater than the length of a portion of the wire that is located at the outermost position of the horizontal straight portion 71*b*.

This prevents the magnetic field from being radiated in an excessively wide range in the circumferential direction of the drum 30 so as to avoid heating components other than the drum 30, and makes it possible to secure arrangement space for a spring or other elements, which may be provided on the outer circumferential surface of the tub 20.

At this time, the surface of the coil 71, which is formed by winding the wire 76, may be curved corresponding to the circumferential surface of the drum 30. In this case, the magnetic flux density of the magnetic field that is radiated to the drum 30 may be further increased.

Further, when the induction module 70 is operated, the drum 30 may be rotated so that the circumferential surface of the drum 30 can be evenly heated.

The tub 20 vibrates during the operation of the laundry treatment apparatus. Thus, in the case in which the coil 71 is mounted on the tub 20, the coil 71 must be stably fixed. To this end, as described above, the induction module 70 includes the base housing 74 in which the coil 71 is mounted and fixed. Hereinafter, an embodiment of the induction module 70 including the base housing 74 will be described in more detail.

Figure 10:
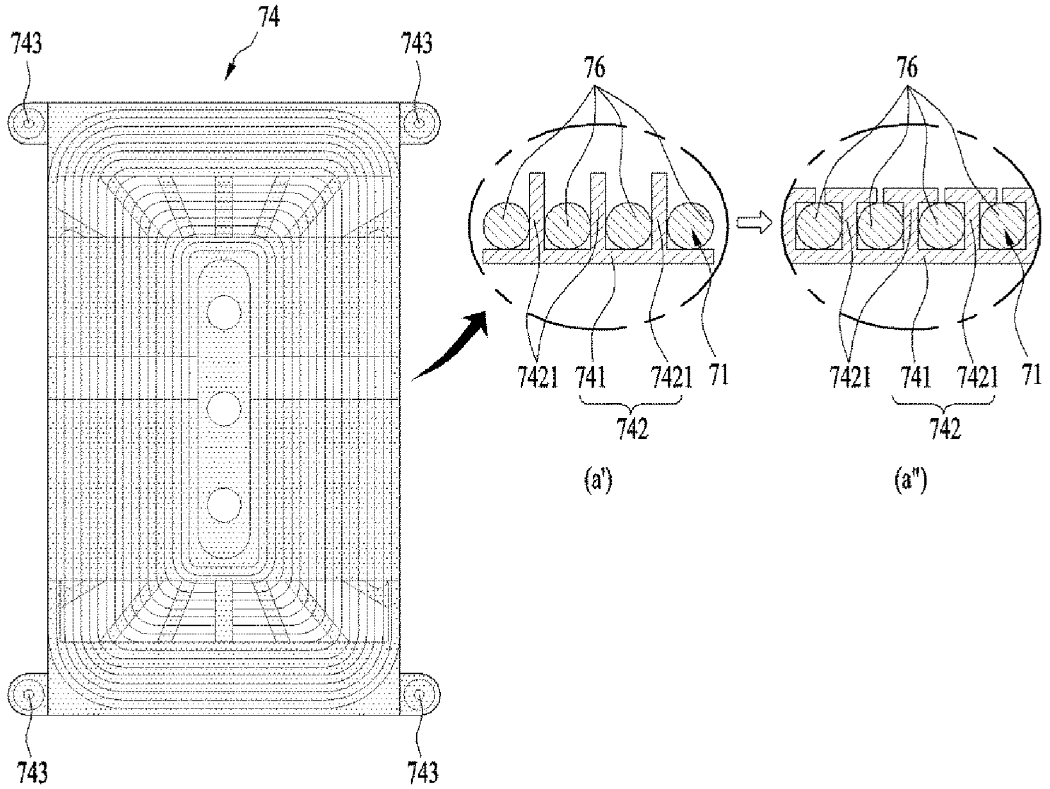
FIG. 10 is a plan view of a base housing according to an embodiment of the present invention.
Figure 11:
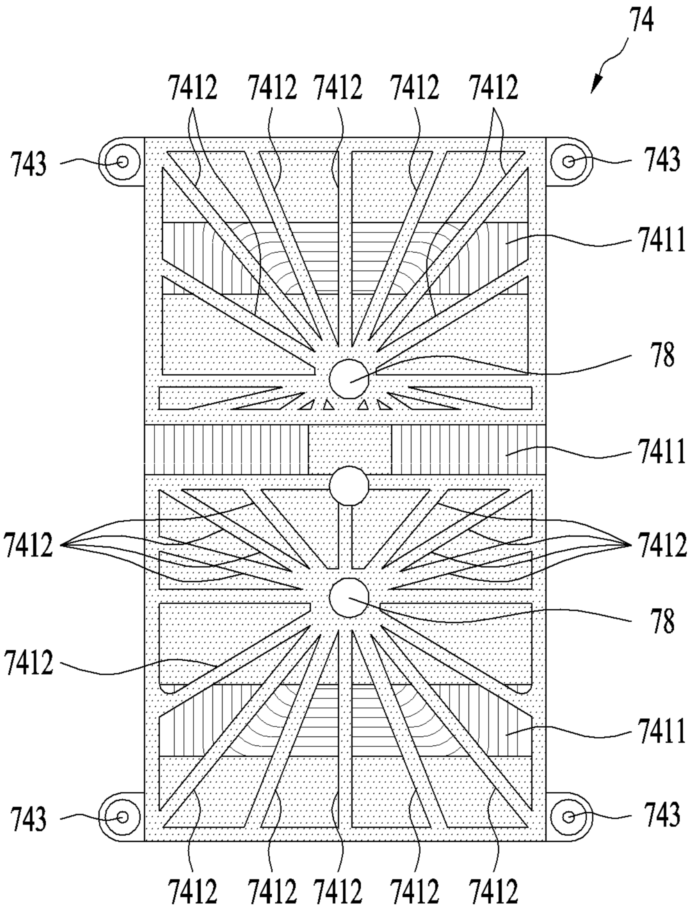
FIG. 11 is a bottom view of the base housing shown in FIG. 10.
Figure 12:
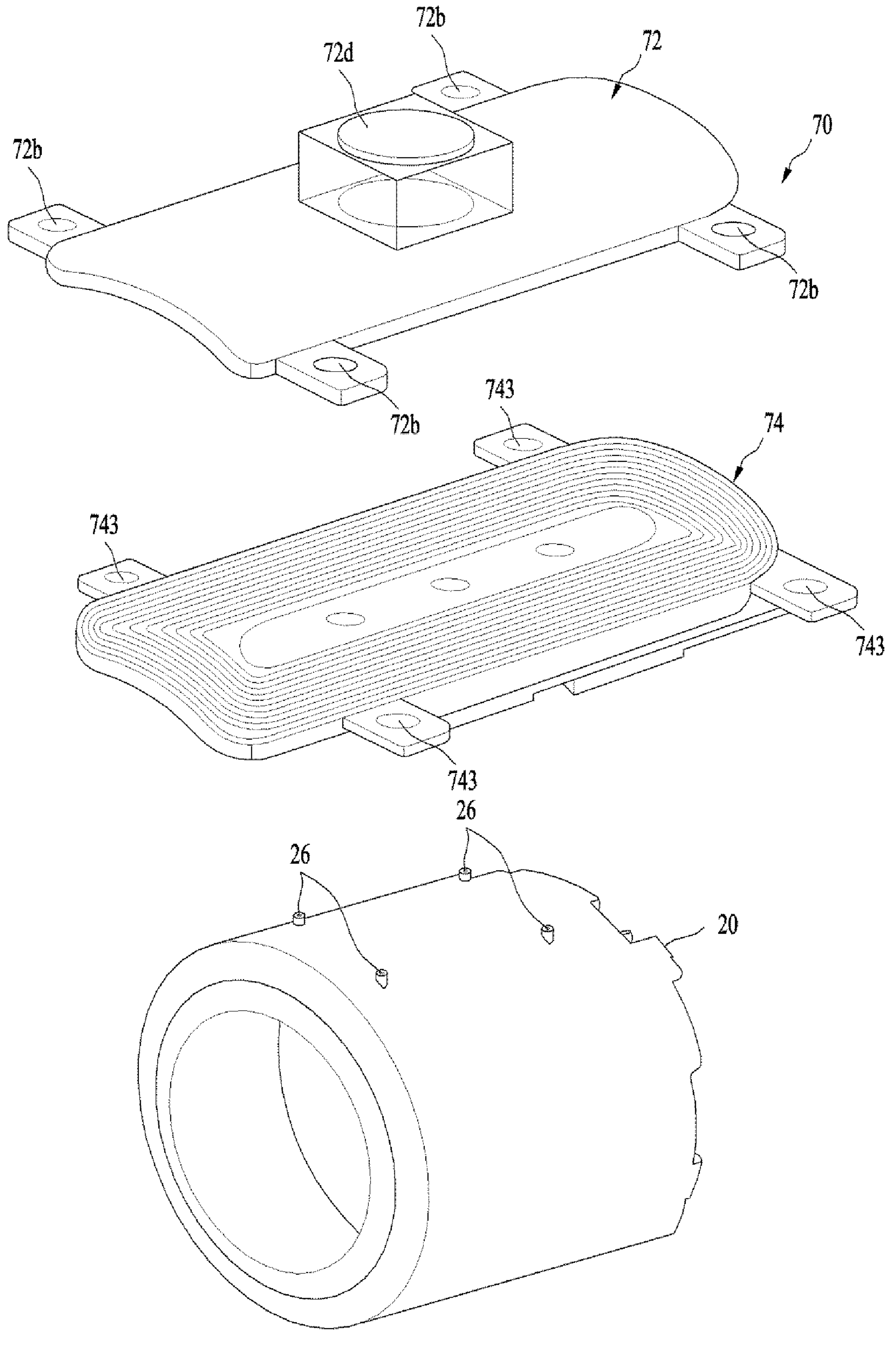
FIG. 12 is an exploded perspective view of a tub and an induction module according to an embodiment of the present invention.

FIG. 10 shows the top surface of the base housing 74, and FIG. 11 shows the bottom surface of the base housing 74. FIG. 12 shows an example of the coil shown in FIG. 7.

FIG. 12 shows the coupling of the base housing 74 and the module cover 72 and the mounting of the induction module 70 on the tub 20.

As shown in FIG. 10, the base housing 74 is configured to accommodate the coil by defining a coil slot 742 in which the wire of the coil is received. The coil slot 742, may has a width that is less than the diameter of the wire 76, so that the wire 76 of the coil 71 is interference-fitted into the coil slot. The width of the coil slot 742 may be set to 93% to 97% of the diameter of the wire 76.

In the state in which the wire 76 is interference-fitted into the coil slot 742, even when the tub 20 vibrates, the wire 76 is fixed in the coil slot 742, and the coil 71 is therefore prevented from undesirably moving.

In this manner, the coil 71 is not separated from the coil slot 742, and undesirable movement thereof is suppressed. Therefore, it is possible to prevent the occurrence of noise attributable to a gap. Further, contact between adjacent portions of the wire is prevented, thereby preventing a short circuit and an increase in resistance attributable to deformation of the wire.

Further, the coil slot 742 may be formed by a plurality of fixing ribs 7421, which protrude upwards from the base housing 74. The height of the fixing ribs 7421 may be greater than the diameter of the coil 71. The base housing may comprises the fixing rib 7421 that protrudes upwards from the base housing and that defines the coil slot. The fixing rib is formed such that an upper end thereof is close contact with the cover. The fixing rib may has a height that is greater than a height of the wire. In a state in which the coil is accommodated in the base housing so that the wire of the coil is received in the coil slot of the base housing, an upper end of the fixing rib is configured to protrude inwards towards the wire and at least partially cover an upper portion of the wire.

The reason for this is to allow both sides of the coil 71 to be brought into close contact with the inner walls of the fixing ribs 7421 and to be securely supported by the same. This configuration is related to a process of melting or bending the upper ends of the fixing ribs 7421, which will be described later.

Through the above-described configuration, since adjacent portions of the wire 76 are spaced apart from each other by the fixing ribs 7421, a short circuit can be prevented, and the wire 76 does not need to be coated with a separate insulation film. Even if the wire 76 is coated with an insulation film, the thickness of the insulation film can be minimized. Accordingly, manufacturing costs can be reduced.

After the wire 76 is inserted into the coil slot, the upper ends of the fixing ribs 7421 may be melted in order to cover the upper portion of the coil 71. That is, the upper ends of the fixing ribs 7421 may be subjected to a melting process.

At this time, the height of the fixing ribs 7421 may be set to 1 to 1.5 times the diameter of the wire 76 so as to cover the upper portion of the coil 71.

Specifically, after the wire is interference-fitted into the coil slot 742 as shown in FIG. 10 (a'), the upper surfaces of the fixing ribs 7421 may be pressed and melted. Subsequently, as shown in FIG. 10 (a"), the melted upper surfaces of the fixing ribs 7421 may be expanded to both sides so as to cover the upper portions of the wire 76 that are located at both sides of each of the fixing ribs 7421. At this time, the fixing ribs 7421, which are adjacent to each other with the wire 76 interposed therebetween, may be melted so that the upper portion of the wire 76 is completely shielded in the coil slot 742, or may be melted so that a gap, which is less than the diameter of the wire 76, is formed above the wire 76.

In another embodiment, the fixing ribs 7421 may be melted to cover the upper portion of the wire 76 that is located at one side of each of the fixing ribs 7421, rather than the upper portions of the wire 76 that are located at both sides of each of the fixing ribs 7421. In this case, each of the fixing ribs 7421 may be melted so that, of the two adjacent portions of the wire 76, only a portion located at the inward position is covered, or only a portion located at the outward position is covered.

The reason why the upper ends of the fixing ribs 7421 are melted in addition to the interference-fitting of the coil 71 into the coil slot 742 is to physically block a path through which the wire 76 may escape and to prevent undesirable movement of the wire 76, thereby preventing the occurrence of noise attributable to vibration of the tub 20, eliminating gaps between parts, and consequently improving the durability of the parts.

The coil slot 742 may include a base 741, which is formed at the lower ends of the fixing ribs 7421 so that the coil 71 fitted between the adjacent fixing ribs 7421 can be seated thereon.

As shown in FIG. 10 (a"), the base 741 shields the bottom of the coil slot, and functions to press and fix the coil 71 together with the upper ends of the fixing ribs 7421 to which the melting process has been applied.

However, a portion of the base 741 may be open. This opening in the base 741 may be referred to as a penetration portion or a through-hole 7411, and will be described later.

Although the coil 71 has been described above as being provided on the top surface of the base housing 74, the fixing ribs 76 may be formed so as to protrude downwards from the base housing 74 so that the coil 71 is provided on the bottom surface of the base housing 74. In this case, even if an additional penetration portion is not formed in the base 741, the space formed by melting the fixing ribs 7421 may serve as the penetration portion.

FIG. 11 is a bottom view of the base housing 74. As shown in the drawing, the base housing 74 may have therein a penetration portion 7411, which is formed so as to penetrate the bottom surface and the top surface of the base housing 74. The penetration portion 7411 may be open so that the coil 71 can face the outer circumferential surface of the tub 20 therethrough, and may be formed according to the winding shape of the wire 76.

In the case in which the penetration portion 7411 is formed according to the winding shape of the wire 76, the magnetic field is smoothly radiated from the wire 76 in the direction toward the drum 30, so that heating efficiency can be increased. In addition, since air can flow through the open surface, the overheated coil 71 can be rapidly cooled.

As shown in FIG. 11, a reinforcing rib or base support bar 7412 is formed on the bottom surface of the base housing 74 so as to extend across the penetration portion or the opening. The base housing 74 of the present invention may further include the reinforcing ribs or base support bars 7412. As least one base support bar is formed at a bottom surface of the base housing so as cross the at least one opening formed in the lower portion of the coil slot.

The reinforcing ribs 7412 may extend radially around fixing points 78, which are formed on both sides of a center point A of the base housing 74, so as to enhance the contact force between the outer circumferential surface of the tub 20 and the base housing 74.

In the case in which base-coupling portions 743, which are provided on both sides of the base housing 74, are fixed to tub-coupling portions 26 provided on the outer circumferential surface of the tub, the outer circumferential surface of the tub 20 is pressed by the reinforcing ribs 7412. Therefore, the base housing 74 can be more securely supported than when the entire bottom surface of the base housing 74 contacts the outer circumferential surface of the tub 20.

Accordingly, even when the tub 20 vibrates, the base housing 74 is not easily moved or separated from the outer circumferential surface of the tub 20.

Further, the base housing 74 may be formed so as to be curved corresponding to the outer circumferential surface of the tub 20 in order to enhance the coupling force between the base housing 74 and the outer circumferential surface of the tub 20.

In order to correspond to the above-described characteristics of the curved portion 71*c* of the coil 71 in which the inner coil portion and the outer coil portion have the same radius of curvature as each other, the top surface of the base housing 74, around which the wire 76 is wound, may be formed such that the curved portions of the fixing ribs 7421 have the same radius of curvature as each other.

The induction module 70 of the present invention may further include a module cover 72, which is coupled to the base housing 74 to cover the coil slot 742.

The cover 72, as shown in FIG. 12, is coupled to the top surface of the base housing 74, and serves to prevent separation of the coil 71 and magnets 80. The magnets 80 may be a permanent magnets.

Specifically, the bottom surface of the cover 72 may be formed so as to come into close contact with the upper end of the coil slot 742 or the upper end of the fixing ribs formed in the base housing 74. Accordingly, the cover 72 is directly coupled to the base housing 74, and thus it can prevent undesirable movement, deformation and separation of the coil 71.

Figure 13:
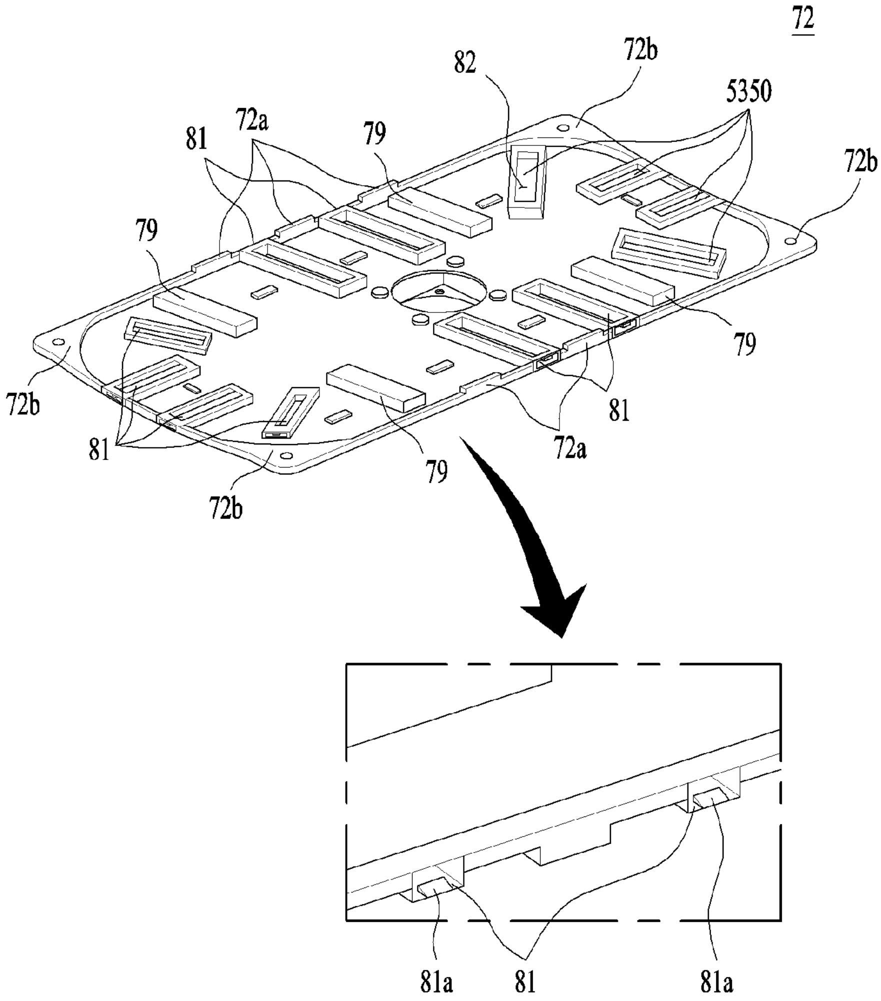
FIG. 13 is a perspective view showing the bottom surface of a module cover according to an embodiment of the present invention.
Figure 14:
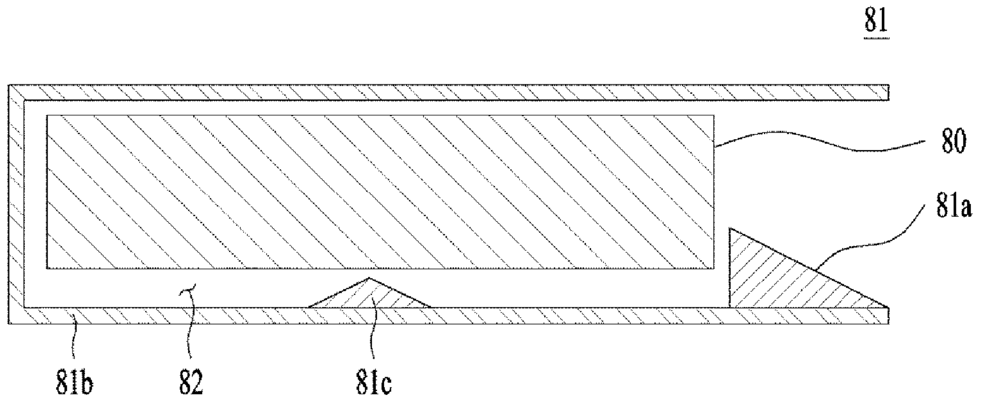
FIG. 14 is a cross-sectional view of a permanent-magnet-mounting portion in FIG. 13.

Further, as shown in FIG. 13, the cover 72 may be provided with a plurality of contact ribs 79, which protrude downwards from the bottom surface of the cover 72 so as to come into close contact with the upper end of the coil slot 742.

When the bottom surfaces of the contact ribs 79 closely contact the coil slot 742, a larger amount of pressure can be applied to a small area than when the entire bottom surface of the cover 72 closely contacts the upper end of the coil slot 742. The contact ribs 79 in this embodiment may be considered the same components as the coil-fixing portions 73 in the above-described embodiment.

Accordingly, the cover 72 can be more securely fixed on the outer surface of the tub 20, and thus it is possible to prevent noise or unexpected disengagement of parts attributable to gaps between the parts even when the tub 20 vibrates.

The contact ribs 79 may be formed in the longitudinal direction of the coil 71. Alternatively, the contact ribs 79 may be formed perpendicular to the longitudinal direction of the coil 71. Therefore, it is possible to securely fix the entire coil without pressing the entire coil.

Here, a spacing interval is required between the cover 72 and the coil 71. The reason for this is that it is desirable for air to flow for heat dissipation. The contact ribs 79 block a portion of the spacing interval. Therefore, the contact ribs form an air flow path as well as fix the coil.

Meanwhile, it is desirable that the contact ribs 79 be integrally formed with the cover 72. Therefore, the cover 72 is coupled to the base housing 74, and the contact ribs 79 press the coil 71 simultaneously therewith. Therefore, a separate member or process of pressing the coil 71 is not necessary.

The permanent magnets 80 for focusing the magnetic field in the direction toward the drum may be interposed between the base housing 74 and the cover 72. The cover 72 may be provided with permanent-magnet-mounting portions 81, into which the permanent magnets 80 can be inserted and mounted. Therefore, when the cover 72 is coupled to the base housing 74 in the state in which the permanent magnets 80 are fixed to the cover 72, the permanent magnets can be fixed to the upper portion of the coil 71.

In order to efficiently focus the magnetic field in the direction toward the drum 30, the permanent magnets 80 may be disposed at specific positions on the top surface of the coil 71. If the permanent magnets 80 are moved by vibration of the tub 20, not only may noise occur, but heating efficiency may also be lowered.

The permanent magnets 80 can be fixed to the positions where the permanent magnets 80 are initially disposed between the base housing 74 and the cover 72 by the permanent-magnet-mounting portions 81, and thus deterioration in heating efficiency can be prevented.

More specifically, each of the permanent-magnet-mounting portions 81 includes both side walls, which protrude downwards from the bottom surface of the cover 72 so as to face each other, and a lower opening 82, through which the bottom surface of the permanent magnet 80 mounted in the corresponding permanent-magnet-mounting portion 81 can face one surface of the coil 71.

In this case, the lateral movement of the permanent magnet 80 may be suppressed by both side walls of the permanent-magnet-mounting portion 81, and the lower opening 82 may allow the permanent magnet 80 to more closely approach to the top surface of the coil 71.

The closer the permanent magnet 80 is to the coil 71, the more intensively the magnetic field is guided toward the drum 30, and as a result, stable and uniform heating of the drum 30 is achieved.

The permanent-magnet-mounting portion 80 may further include an inner wall 81*b*, which protrudes downwards from the bottom surface of the cover 72 so as to be connected with the ends of the both side walls, an open surface, which is formed opposite the inner wall, and a latching portion 81*a*, which is formed near the open surface in order to prevent the permanent magnet 80 from being separated from the cover 72.

The movement in the forward-and-backward direction of the permanent magnet 80 can be suppressed by the inner wall 81*b* and the latching portion 81*a*. Therefore, as described above, stable and uniform heating of the drum 30 can be achieved. In addition, in the case in which the temperature of the permanent magnet 80 is increased by the overheated coil 71, it is also possible to dissipate heat through the open surface.

The base housing 74 may further include a permanent magnet pressing portion 81*c*, which protrudes upwards into the space defined by the lower opening 82 in order to press the bottom surface of the permanent magnet 80. The permanent magnet pressing portion 81*c* may be implemented by a plate spring or a projection made of a rubber material.

When the vibration of the tub 20 is transferred to the permanent magnet 80, noise may be generated from the permanent magnet 80 due to a gap, which may be formed between the coil slot 742 and the permanent-magnet-mounting portion 81.

The permanent magnet pressing portion 81*c* prevents the occurrence of noise by alleviating vibration, and prevents the formation of a gap, thereby preventing damage to the permanent magnet 80 and the permanent-magnet-mounting portion 81 attributable to vibration.

In order to enhance the coupling force and to stably heat the drum 30, the lower end of the permanent-magnet-mounting portion 81 may be formed so as to closely contact the upper end of the coil slot 742.

In this case, since the bottom surface of the permanent magnet 80 is located relatively close to the coil 71 as described above, the drum 30 can be more evenly heated. Further, the bottom surface of the permanent magnet 80 also functions as the contact rib 79, and thus enhances the coupling force between the cover 72 and the base housing 74.

In addition, in the case in which the base housing 74 is formed so as to be curved corresponding to the outer circumferential surface of the tub 20, the cover 72 may also be formed so as to be curved with the same curvature as the base housing 74.

In another embodiment of the present invention, the permanent-magnet-mounting portion 81 may be provided at the base housing 74.

The base housing 74 may be formed such that the permanent-magnet-mounting portion 81 is provided on the fixing ribs 7421. At this time, the permanent magnet pressing portion 81*c* may be provided at the bottom surface of the cover 72.

FIG. 12 shows the coupling structure of the tub 20, the base housing 74 and the cover 72. As shown in the drawing, the tub 20 includes the tub-coupling portions 26, the base housing 74 includes the base-coupling portions 743, and the cover 72 includes the cover-coupling portions 72*b*.

The tub-coupling portions 26 have therein tub-coupling holes, the base-coupling portions 743 have therein base-coupling holes, and the cover-coupling portions 72*b* have therein cover-coupling holes. The above coupling holes may be formed to have the same diameter as each other. Accordingly, the tub 20, the base housing 74 and the cover 72 may be coupled to each other using one type of screw.

As a result, the assembly process may be simplified, and manufacturing costs may be reduced.

In addition, in the case in which the both end portions B1 and B2 of the coil are disposed near the front and rear portions of the tub 20, the tub-coupling portion 26, the base-coupling portion 743 and the cover-coupling portion 72*b* may be formed such that the above coupling holes are located at both sides of the coil 71 in order to secure the mounting space.

In addition, the cover 72 may further include cover-mounting ribs 72*a*, which protrude downwards from both side edges thereof, so that the cover 72 can be easily mounted in place in the base housing 74 and so that the lateral movement of the cover 72 can be prevented.

Meanwhile, the cover 72 may be provided with a fan-mounting portion 72*d*. The fan-mounting portion 72*d* may be formed at the center of the cover 72.

Air may be introduced into the cover 72, i.e. into the induction module, through the fan-mounting portion. Since a space is formed between the cover 72 and the base housing 74 inside the induction module, an air flow path is formed. The base housing has therein the penetration portion or the opening. Thus, the air may cool the coil 71 in the inner space, and may be discharged outside the induction module through the penetration portion or the opening in the base housing.

In the embodiment of the present invention, although the induction module 70 has been described above as being provided on the outer circumferential surface of the tub 20, the induction module 70 may alternatively be provided on the inner circumferential surface of the tub 20, or may form the same circumferential surface together with the outer wall of the tub 20.

Here, it is desirable that the induction module 70 be located as close to the outer circumferential surface of the drum 30 as possible. That is, the magnetic field generated by the induction module 70 is significantly reduced as the distance from the coil increases.

Hereinafter, embodiments of the structure for reducing the distance between the induction module 70 and the drum will be described. The features of these embodiments may be realized in combination with the above-described embodiments.

A module-mounting portion 210, which is located on the outer circumferential surface of the tub 20 and on which the induction module 70 is mounted, may be formed further radially inwards than the outer circumferential surface of the tub 20 having a reference radius. In an embodiment, the module-mounting portion 210 may form a surface that is depressed from the outer circumferential surface of the tub.

As described above, if the distance between the module-mounting portion 210 and the drum 30 is reduced, the heating efficiency of the induction module 70 can be increased. In the case in which a constant alternating current flows through the induction module 70, the change in intensity of the alternating current magnetic field generated by the coil 71 is constant. However, the change in intensity of the alternating current magnetic field is significantly reduced as the distance increases. Accordingly, if the distance between the module-mounting portion 210 and the drum 30 is reduced, the intensity of the induced magnetic field generated by the alternating current magnetic field is increased, and a strong induced current flows through the drum 30, thereby increasing induction heating efficiency.

In the case in which the laundry treatment apparatus is a drum washing machine, it is desirable that the module-mounting portion 210 be located at the upper portion of the tub 20. The module-mounting portion 210 may be in close contact with and fixed to the tub 20 in consideration of the weight of the induction module 70. Further, because the drum 30 is inclined downwards by the weight thereof according to the rotation structure thereof, when the module-mounting portion is located at the upper portion of the tub 20, collision with the drum 30 may be minimized. However, in the case in which the laundry treatment apparatus is a top-loading-type washing machine, the position of the module-mounting portion does not need to be limited to the upper or lower portion.

The portion of the inner circumferential surface of the tub 20 that faces the module-mounting portion 210 may be formed further radially inwards than the inner circumferential surface of the tub having the reference radius. That is, in the case in which a portion of the outer circumferential surface of the tub 20 is depressed in the inward direction, the thickness between the inner circumferential surface and the outer circumferential surface of the tub 20 at the depressed portion may be decreased. In other words, at least part of the at least one mounting portion is arranged radially closer to a rotation axis of the drum than a remaining portion of the outer surface of the tub. The at least one mounting portion is located at an upper portion of the tub.

In this case, since the strength of the depressed portion may be decreased, the portion of the inner circumferential surface of the tub 20 that faces the module-mounting portion 210 is formed further radially inwards than the inner circumferential surface of the tub having the reference radius so that the thickness between the inner circumferential surface and the outer circumferential surface of the tub can be maintained constant. However, it is desirable that a portion of the inner circumferential surface of the tub 20, which faces the module-mounting portion 210, be provided radially outside the outer circumferential surface of the rotating drum 30.

In other words, the thickness of the circumferential surface of the tub corresponding to the module-mounting portion 210 may be made smaller than the thickness of other portions of the tub. However, it is desirable to maintain a substantially constant thickness. Therefore, the inner circumferential surface and the outer circumferential surface of the tub at the portion corresponding to the module-mounting portion 210 are located further radially inwards than the inner circumferential surface and the outer circumferential surface of the tub at other portions. That is, the portion of the tub that corresponds to the module-mounting portion 210 may be formed in a depressed shape. Of course, the module-mounting portion 210 may have an entirely depressed shape or a partially depressed shape. More specifically, only a portion of the module-mounting portion 210 that faces the coil may be formed in a depressed shape. Similarly, a portion of an inner surface of the tub that corresponds to a location of the at least one mounting portion is arranged radially closer to the rotational axis of the drum than a remaining portion of the inner surface of the tub.

The module-mounting portion 210 may be formed so as to extend from the front side to the rear side of the tub. However, in the case in which the module-mounting portion has a length shorter than the length in the forward-and-backward direction of the tub, it may be located at the center of the length in the forward-and-backward direction of the tub. When the induction module is located at the center portion, heat can be evenly generated in the drum.

Figure 15:
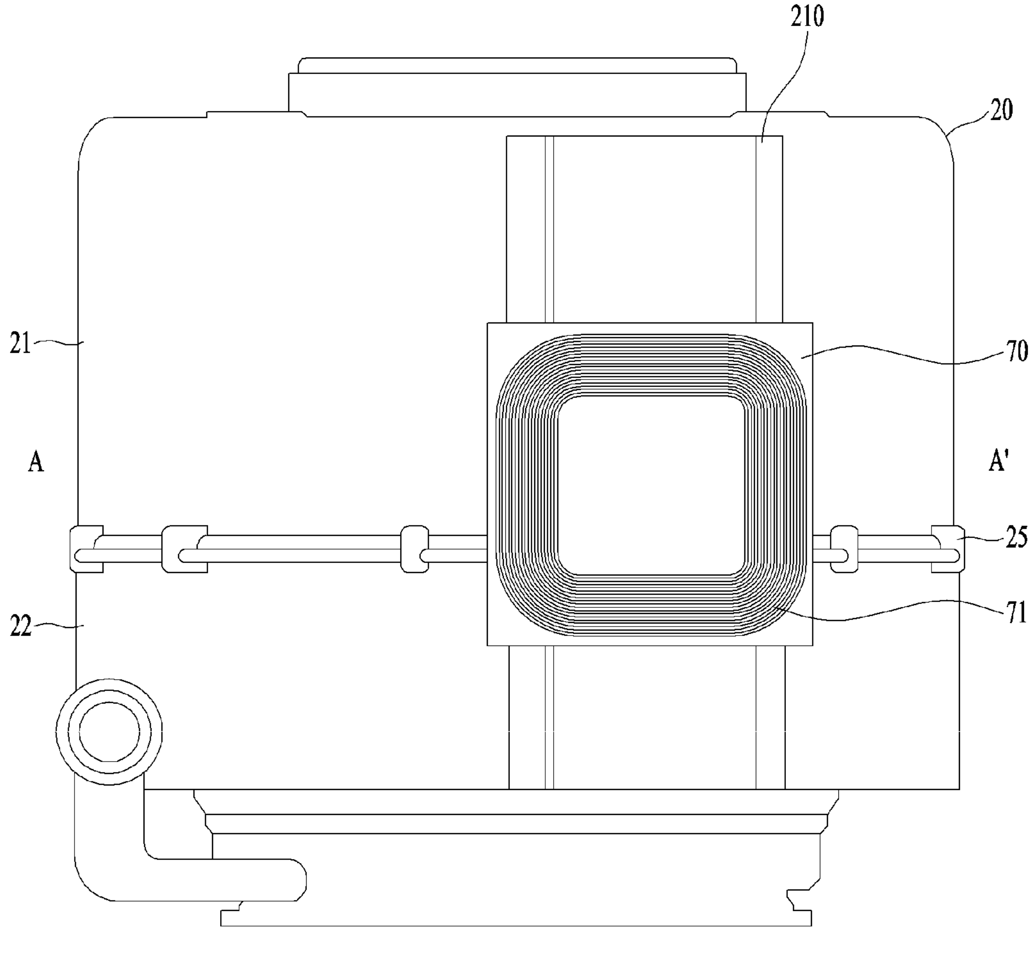
FIG. 15 is a plan view showing an induction module and an induction-module-mounting portion according to an embodiment of the present invention.
Figure 16:
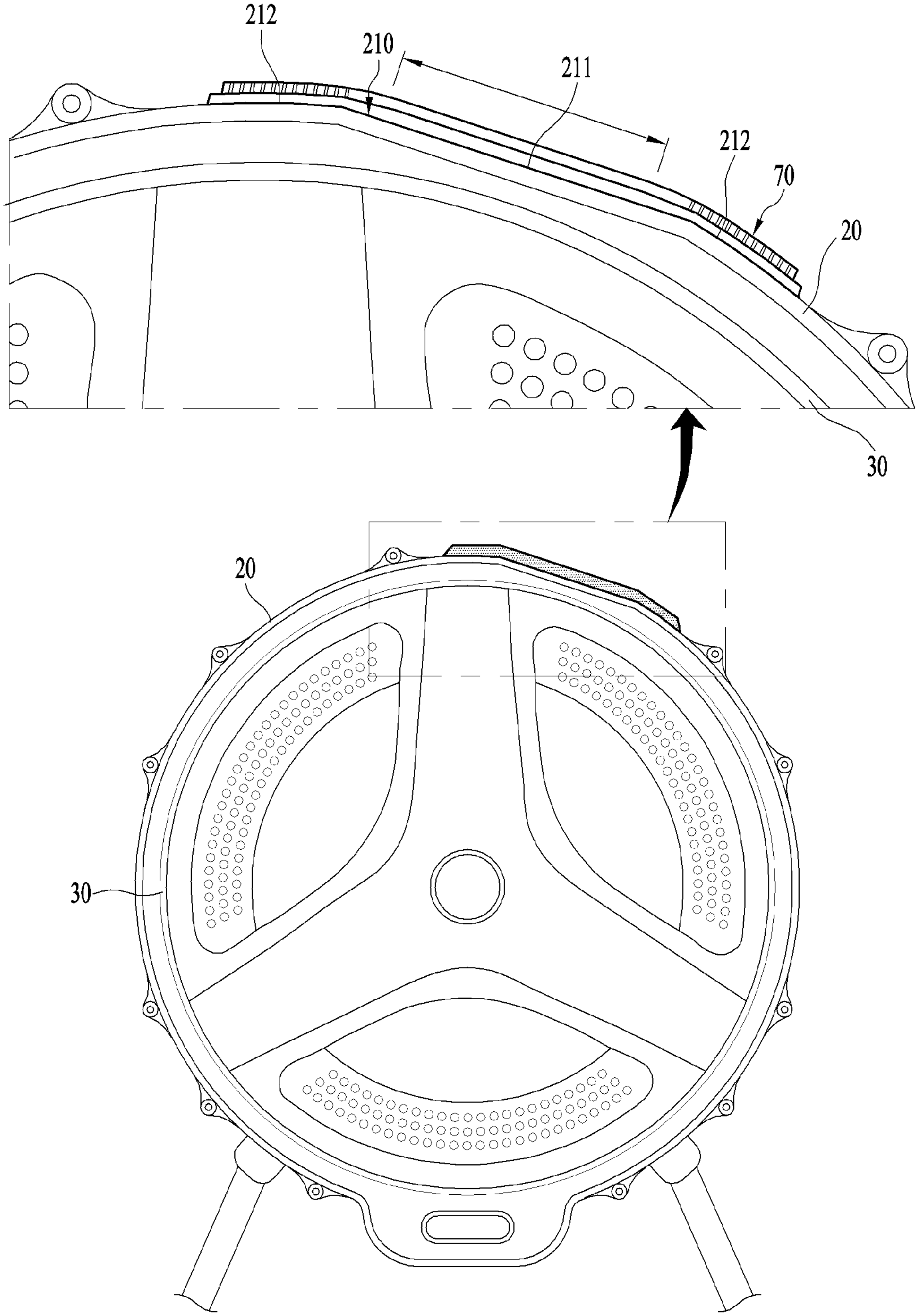
FIG. 16 is a cross-sectional view taken along line A-A' in FIG. 15.

Hereinafter, an embodiment of the module-mounting portion 210, on which the induction module 70 is mounted, will be described with reference to FIGS. 15 and 16. In addition, the structure for mounting the induction module 70 to the module-mounting portion 210 will be described.

In order to be formed further radially inwards than the outer circumferential surface of the tub 20 having the reference radius, the module-mounting portion 210 may include a straight region 211 in the cross-section thereof that is perpendicular to the rotational axis of the drum 30. For example, each of the cylindrical-shaped tub 20 and the cylindrical-shaped drum 30 has a circular-shaped cross-section (the section A-A' in FIG. 15). The circular-shaped cross-section of the tub has substantially the same radius throughout the circumference thereof. The circular-shaped cross-section of the drum also has substantially the same radius throughout the circumference thereof. Therefore, the straight region 211 may be formed in a portion of the circular-shaped cross-section of the tub. Thus, the straight region may be regarded as a portion corresponding to a zero gradient in the mold for forming the tub. This straight region or zero gradient may be formed in order to further reduce the distance between the coil and the drum. In other words, an outer surface of at least one region of the at least one mounting portion is flat. At least one region of the at least one mounting portion has a rectangular-shape.

Generally, the drum 30 may be formed in a cylindrical shape in order to secure the maximum accommodation space while requiring the minimum volume when rotating. At this time, in the case in which the tub 20 also has a cylindrical shape, the interval between the outer circumferential surface of the tub 20 and the drum 30 is constant.

However, the module-mounting portion 210 includes the straight region 211, and the distance between the straight region 211 and the center of the tub may be set to be less than the radius of the tub. Of course, the distance between the straight region and the center of the tub may vary within a range smaller than the interval between the outer circumferential surface of the tub 20 having the reference radius and the drum 30. The straight region can be said as a flat region.

The module-mounting region 210 may include a rectangular-shaped surface, and the straight region 211 may form a width in the circumferential direction of the rectangular-shaped surface. However, the shape of the module-mounting portion 210 is not limited to a rectangular shape. Depending on the circumstances, the shape of the module-mounting portion 210 may include a circular shape, a diamond shape, an oblique rectangular shape, and the like.

In the case in which the module-mounting portion 210 forms a rectangular-shaped surface, the manufacture of the induction module 70 and the installation thereof on the module-mounting portion may be facilitated.

At this time, the rectangular-shaped surface may be formed such that the width in the axial direction thereof is greater than the width in the circumferential direction thereof. The width in the circumferential direction of the rectangular-shaped surface is inevitably limited in consideration of the distance from the drum 30. Therefore, it is desirable to increase the area on which the induction module 70 can be mounted by increasing the width in the axial direction.

The straight region of the module-mounting portion 210, i.e. the straight region formed in the circumferential direction of the tub, may include connection regions 212 for connecting both ends of the straight region to the circumferential surface of the tub 20. At this time, the connection regions 212 may be formed in a curved or straight shape. In this case, the connection regions 212 may also be formed further radially inwards than the outer circumferential surface of the tub 20 having the reference radius in order to reduce the distance from the outer circumferential surface of the drum 30.

The length of the straight region 211 may be limited in consideration of the distance from the drum 30, and the width in the circumferential direction of the induction module 70 may exceed the straight region 211.

Due to the connection regions 212 formed at the both ends of the straight region 211 so as to be connected with the circumferential surface of the tub 20, the area of the module-mounting portion 210 can be increased, and the distance from the drum 30 can be reduced.

The coil 71 of the induction module 70 may be mounted parallel to the module-mounting portion 210 in order to minimize the distance from the drum 30. Specifically, the induction module 70 may include a coil 71, which receives electric energy to form a magnetic field, and the coil 71 may be arranged so as to be wound at least once while being spaced apart from the module-mounting portion 210. Thus, the distance between the coil 71, which forms the magnetic field, and the drum 30, through which an induced current flows, may be reduced.

The induction module 70 may be located at the center of the straight region 211. Specifically, the center portion of the coil 71 of the induction module 70 may be located in a virtual plane, which includes the rotational axis of the drum 30 and is perpendicular to the straight region 211.

That is, the coil 71 of the induction module 70 is provided on the module-mounting portion 210 such that the center portion thereof is the closest to the drum 30 and such that the distance from the drum 30 is gradually increased from the center portion to both ends thereof.

Specifically, the distance from the center of the straight region 211 to the drum 30 is minimized, and the distance from the drums 30 is gradually increased from the center of the straight region 211 to both sides thereof. In this case, the magnetic field generated by the coil 71 wound in the circumferential direction of the tub 20 generates a strong induced current in the drum 30.

When the entire module-mounting portion 210 has the same curved shape as the tub, the distance between the coil and the drum is constant, e.g. about 30 mm, in the circumferential direction. For example, the connection regions 212 shown in FIG. 16 are curved regions that have the same curved shape as the tub. Therefore, the distance between the coil and the outer circumferential surface of the drum in the curved regions is constant, e.g. about 30 mm.

However, in the straight region 211, the distance between the coil and the outer circumferential surface of the drum may vary in the range from about 24 to 30 mm. For example, the distance between the coil and the outer circumferential surface of the drum at the center of the straight region may be about 24 mm, and the distance at both ends of the straight region may be about 28 mm. Therefore, the distance from the outer circumferential surface of the drum is substantially reduced in a large portion of the entire area of the coil.

The straight region 211 in the above embodiment may be formed at the center of the module-mounting portion 210. Therefore, it is possible to further concentrate the coil at the portion corresponding to the straight region 211.

Figure 17:
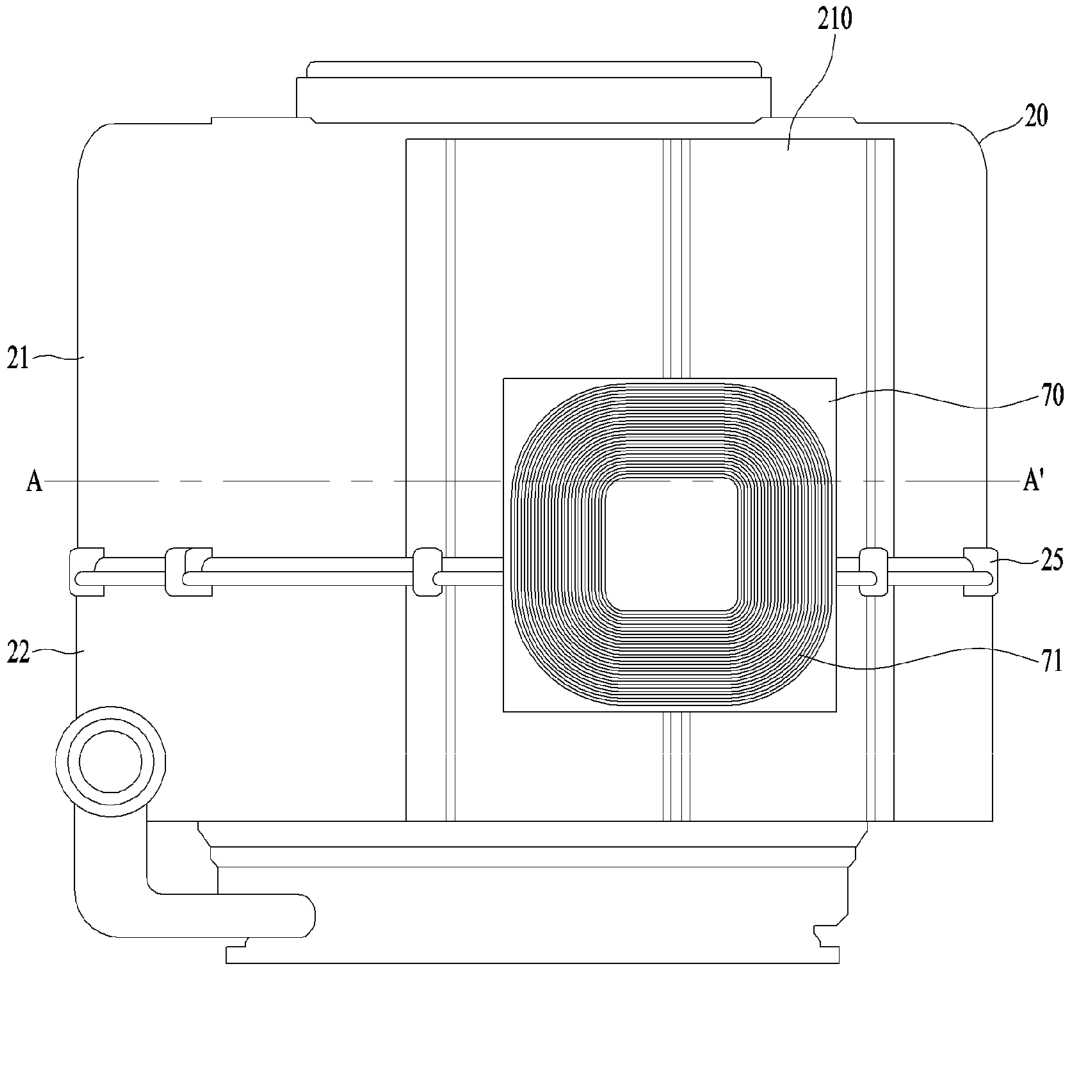
FIG. 17 is a plan view showing an induction module and an induction-module-mounting portion according to an embodiment of the present invention.

Hereinafter, an embodiment of the module-mounting portion 210, on which the induction module 70 is mounted, will be described with reference to FIGS. 17 and 18. In addition, the structure of mounting the induction module 70 to the module-mounting portion 210 will be described.

In order to be formed further radially inwards than the outer circumferential surface of the tub 20 having the reference radius, the module-mounting portion 210 may include a first straight region 211*a* and a second straight region 211*b* in the cross-section thereof that is perpendicular to the rotational axis of the drum 30. Here, the first straight region and the second straight region may be located at positions further radially inward than the reference radius of the tub. Here, the first straight region and the second straight region may be considered zero gradients.

At this time, the first straight region 211*a* and the second straight region 211*b* may be connected to each other via a connection region 212. The connection region 212 may be formed in a curved or straight shape.

Each of the first straight region 211*a* and the second straight region 211*b* may form a width in the circumferential direction of a rectangular-shaped surface included in the module-mounting portion 210. At this time, the rectangular-shaped surface is formed to facilitate the formation and the installation of the induction module 70, and is not limited to the rectangular shape.

That is, the module-mounting portion 210 may be formed such that at least two rectangular-shaped surfaces are connected to each other. In other words, two straight regions located at both sides may be connected to each other via a curved region located at a center portion. The module-mounting portion 210 may be formed by combining the straight regions and the curved region.

The straight region 211 cannot be formed over a predetermined length in consideration of the interval between the drum 30 and the tub 20. Therefore, the module-mounting portion 210, which includes the first straight region 211*a* and the second straight region 211*b*, can form a large area in the circumferential direction without being in contact with the drum 30.

Of course, both ends of the straight region 211 or one end of the straight region 211 may be provided outside the reference radius of the tub. In this case, the region provided outside the reference radius of the tub may be considered a region extending in the radial direction of the tub. However, this extending region may be only a portion for mounting the induction module on the base housing 74. That is, the coil may not be located in the extending region. This is because the coil 71 is located inside the base housing 74 so that the edges of the base housing 74 surround the coil 71. In other words, a spacing interval is provided between the coil 71 and the outermost edge of the base housing 74, and the spacing interval may be opposite the extending region.

The length of the first straight region 211*a* and the length of the second straight region 211*b* may be equal to each other. The length of the straight region 211 means the distance from the drum 30. When the length is short, the distance from the drum 30 is long. Thus, it is desirable that the first straight region and the second straight region be formed symmetrical to each other. Through this configuration, it is possible to easily from the induction module and to securely fix the induction module to the module-mounting portion.

The induction module 70 may be provided over the first straight region 211*a* and the second straight region 211*b* of the module-mounting portion 210. Specifically, both ends in the circumferential direction of the induction module 70 are located at the centers of the first straight region 211*a* and the second straight region 211*b*, and the center of the induction module 70 is located in the region to which the first straight region 211*a* and the second straight region 211*b* are connected.

At this time, the coil 71 of the induction module 70 may be formed so as to be wound at least once between the front side of the tub 20 and the rear side thereof around the connection region 212. At this time, in the case in which the coil 71 is wound parallel to the module-mounting portion 210, the induction module may be located closest to the drum 30 at both ends in the circumferential direction of the tub, and the distance from the drum 30 may be gradually increased from the both ends in the circumferential direction of the tub to the center portion thereof.

In this case, the magnetic field generated by the coil 71 wound in the axial direction of the tub 20 generates a strong induced current in the drum 30.

When the entire module-mounting portion 210 has the same curved shape as the tub, the distance between the coil and the drum is constant, e.g. about 30 mm, in the circumferential direction. For example, the connection region 212 shown in FIG. 18 is a curved region that has the same curved shape as the tub. Therefore, the distance between the coil and the outer circumferential surface of the drum in the curved region is constant, e.g. about 30 mm.

However, in the first straight region 211*a*, the distance between the coil and the outer circumferential surface of the drum may vary in the range from about 24 to 30 mm. For example, the distance between the coil and the outer circumferential surface of the drum at the center of the straight region may be about 24 mm, and the distance at both ends of the straight region may be about 26 mm. Therefore, the distance from the outer circumferential surface of the drum is substantially reduced in a large portion of the entire area of the coil.

Therefore, in the above-described embodiments, efficiency can be increased by reducing the distance between the coil and the outer circumferential surface of the drum by forming the module-mounting portion 210 to have a straight region in the circumferential direction of the tub. In particular, the straight region may be matched with the shape of the base housing forming the coil. The module-mounting portion and the tub may be more securely coupled to each other through the combination of the straight region and the curved region.

In the above-described embodiments, it has been described that it is desirable for the coil to have a hollow center portion. In particular, referring to FIG. 12, the center portion of the coil is hollow in a track shape. Such a hollow portion may correspond to the curved region, i.e. the connection region 212, in FIG. 18. Therefore, the portion where the coil is formed may substantially correspond to the straight region. Therefore, it is more desirable to form straight regions at the left and right portions of the module-mounting portion 210 and to form a curved region between the straight regions, i.e. at the lateral center of the module-mounting portion.

Figure 19:
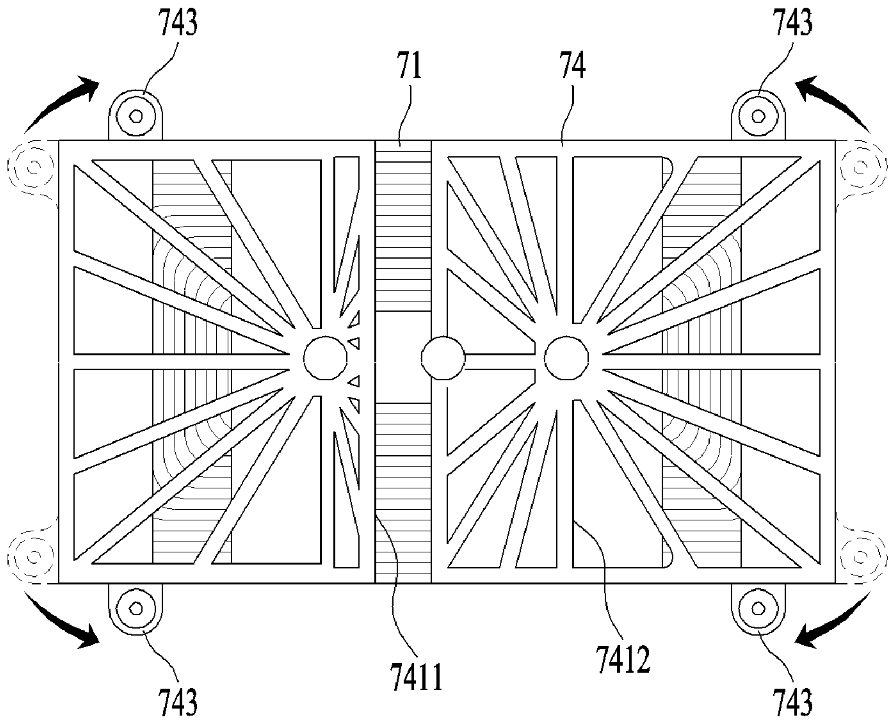
FIG. 19 is a bottom view of a base housing according to an embodiment of the present invention.

Hereinafter, the structure of the induction module 70, particularly the structure and position of the coupling portions 743 of the base housing 74 will be described in detail with reference to FIG. 19.

As described above, the induction module 70 may be formed long in the axial direction of the drum 30. The length of the straight region 211 of the module-mounting portion 210, on which the induction module 70 is mounted, is limited, and thus it is desirable for the induction module to evenly heat the drum 30 with a minimum area in consideration of the rotating direction of the drum 30.

At this time, the length in the axial direction of the coil 71 may be shorter than the length of the drum 30, which can be heated, by about 20 to 40 mm. Specifically, the coil 71 may be formed so as to be spaced apart from the front and rear sides of the drum, which can be heated, by about 10 to 20 mm.

The base housing 74 may be coupled to the outer circumferential surface of the tub 20 or the module-mounting portion 210 through the coupling portions 743, which protrude from both ends in the circumferential direction thereof and extend in the circumferential direction. At this time, the coupling portions 743 may be provided at both ends in the circumferential direction of the front and rear sides of the base housing 74.

In the above-described embodiment, the coupling portions 743 are located at the front portion and the rear portion of the base housing 74. This arrangement position of the coupling portions 743 may effectively prevent the base housing 74 from moving in the forward-and-backward direction of the tub. However, in this case, it is not possible to effectively prevent the base housing 74 from moving in the circumferential direction of the tub.

For this reason, this embodiment proposes an example in which the coupling portions 743 protrude from both lateral sides of the base housing in the circumferential direction. That is, according to this example, the length of the base housing 74 surrounding the outer circumferential surface of the tub is further increased by the coupling portions 743. As described above, the base housing 74 and the module-mounting portion 210 may be formed through the combination of the straight region and the curved region on the outer circumferential surface of the tub in the circumferential direction. Therefore, the base housing 74 may be more securely coupled and fixed to the tub merely by extending the coupling portions 743 without extending the base of the base housing 74 in the circumferential direction. In other words, it is possible to more securely couple and fix the base housing by forming the coupling portions at the front end and the rear end of both sides of the base housing, rather than forming the coupling portions at both ends of the front and rear portions of the housing.

Further, due to this arrangement position of the coupling portions, the base housing 74 may be formed as long as possible in the axial direction while securing a space in the base housing 74 for accommodating the coil 71 therein. In addition, the distance between the base housing 74 and the drum 30 may be minimized by bringing the base housing 74 into close contact with the cylindrical-shaped tub 20.

Further, the coupling portions 743 may correspond to the straight region of the module-mounting portion 210. That is, the coupling portions and the module-mounting portion may be formed such that the horizontal surfaces thereof are in contact with each other. That is, the module-mounting portion may further include straight regions corresponding to the coupling portions 743 of the base housing, or the existing straight region of the module-mounting portion may be further extended. Through this configuration, the base housing may be more stably mounted on the module-mounting portion, which is a part of the outer circumferential surface of the tub.

Hereinafter, the structures of a connecting portion 25 of the tub 20 and the base housing 74 will be described with reference to FIG. 20.

In accordance with manufacturing convenience and respective functions, the tub 20 includes a front tub 22, which surrounds the front portion of the drum 30, a rear tub 21, which surrounds the rear portion of the drum 30, and a connecting portion 25, which connects the front tub 22 and the rear tub 21 to each other and is formed in the circumferential direction of the tub 20. The induction module 70 may be provided over the front tub 22 and the rear tub 21. The connecting portion 25 may be located at the approximate center in the forward-and-backward direction of the tub 20.

The connecting portion 25 may be a portion that protrudes from the outer circumferential surfaces of the front tub 22 and the rear tub 21 to the greatest extent in the radial direction. In other words, since the connecting portion 25 is a portion to which the front tub 22 and the rear tub 21 are coupled, it may be extended radially outwards to increase the coupling area. The connecting portion 25 may be formed over the entire outer circumferential surface of the tub in the circumferential direction thereof.

Thus, when the induction module is mounted on the outer circumferential surface of the tub, interference between the induction module and the connecting portion may occur. In order to avoid this interference, the induction module must be provided radially outside the connecting portion. Therefore, the interval between the induction module and the drum is inevitably increased.

Therefore, it is necessary to reduce the distance by which the induction module 70 is separated by the connecting portion 25 in order to increase the induction heating efficiency.

The induction module 70 includes reinforcing ribs 7412, which protrude downwards from the bottom surface of the base housing 74 and compensate for the gap between the outer circumferential surface of the tub 20 and the bottom surface of the base housing 74. The reinforcing ribs may be formed in front of and behind the connecting portion 25 protruding from the outer circumferential surface of the tub. The protruding length of the connecting portion 25 and the protruding length of the reinforcing ribs are set to be equal to each other. Accordingly, the reinforcing ribs compensate for the gap between a portion of the base housing 74, which is not in contact with the connecting portion 25, and the outer circumferential surface of the tub 20. At this time, the reinforcing ribs may be formed in a portion of the base housing 74, which is not in contact with the connecting portion 25, in the radial direction, thereby increasing the strength of the base housing 74.

In other words, the connecting portion 25 may be formed so as to come into contact with the bottom surface of the base 741 of the base housing 74. That is, the connecting portion 25 may perform the same function as the reinforcing ribs 7412. Therefore, the base housing 74 may also be more securely coupled to the tub 20 through the connecting portion 25.

The connecting portion 25 may include a first coupling rib 211 and a second coupling rib 221. That is, the first coupling rib 211 and the second coupling rib 221 may be joined to each other to form the connecting portion 25. The first coupling rib 211 may be formed at the front tub 22, and the second coupling rib 221 may be formed at the rear tub 21. Of course, the opposite is also possible. The connecting portion 25 will be described based on an example in which the first coupling rib 211 is formed at the rear tub 21 and the second coupling rib 221 is formed at the front tub 22 for convenience of explanation.

A portion of the connecting portion 25 is located under the induction module 70. That is, a portion of the connecting portion formed in the circumferential direction of the tub, which corresponds to a certain angle, is located under the induction module. This portion is also referred to as the module-mounting portion.

The first coupling rib 211 may protrude radially outwards from a portion near the distal end (the front end) of the rear tub 21, and may then be bent to form an insertion groove. The second coupling rib 221 may be formed so as to protrude radially outwards from a portion near the distal end (the rear end) of the front tub.

The first coupling rib 211 forms an insertion groove together with the distal end of the rear tub 21. The distal end of the front tub 22 may be inserted into the insertion groove. A sealing member such as a rubber packing may be inserted into the insertion groove. Therefore, when the distal end of the front tub 22 is inserted into the insertion groove, the sealing member may be compressed, and may perform a sealing function.

Figure 20:
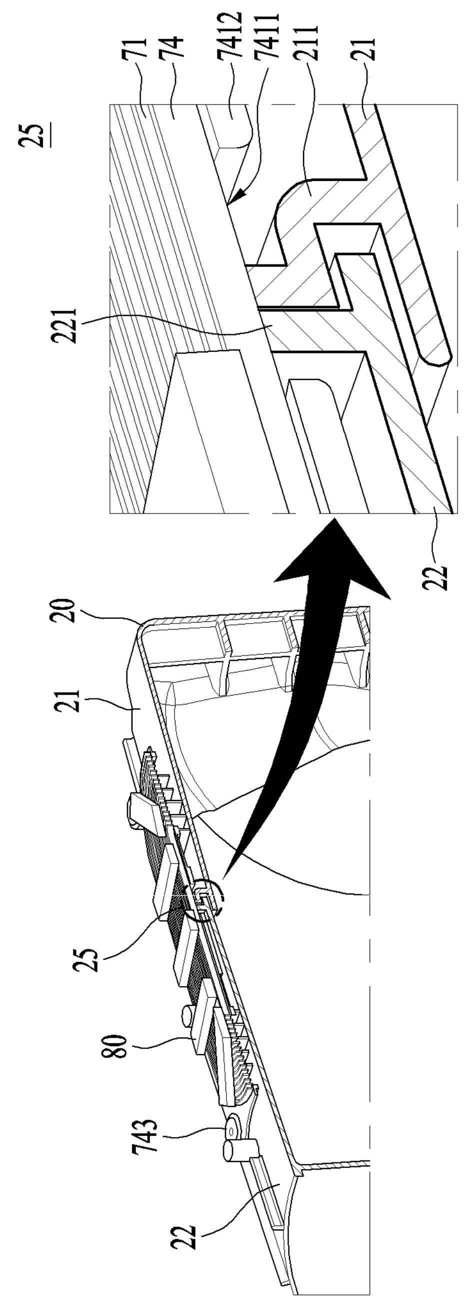
FIG. 20 is a view showing an embodiment of a connecting portion connecting a front tub and a rear tub and the coupling with a base housing.

As shown in FIG. 20, the distal end of the first coupling rib 211 may be bent radially outwards. The second coupling rib 221 may protrude radially outwards so as to come into contact with the first coupling rib 211. The coupling area in the connecting portion 25 may be increased due to the shapes of the first coupling rib 211 and the second coupling rib 221. That is, the coupling area may be increased by the radially-extending portion. However, in this case, the protruding length of the connecting portion is inevitably increased. Thus, the distance between the coil 71 and the drum 20 is also increased.

Therefore, the base housing 74 may be provided therein with a penetration portion 7411, into which the connecting portion 25 is inserted. The base housing 74 is fixed by inserting the connecting portion 25 into the penetration portion 7411. Thus, the coil may become closer to the outer circumferential surface of the tub. That is, the coil is substantially brought into contact with the radially outer surface of the connecting portion, with the result that the gap between the coil and the outer circumferential surface of the tub may be minimized.

In this case, the base of the base housing may be omitted from the penetration portion, and only the coil slot may be formed therein. Therefore, the coil may also be provided in the penetration portion, and may be brought into contact with the radially outer surface of the connecting portion. To this end, the radially outer surface of the first coupling rib 211 and the radially outer surface of the second coupling rib 221 may be formed to have the same radius as each other.

Figure 21:
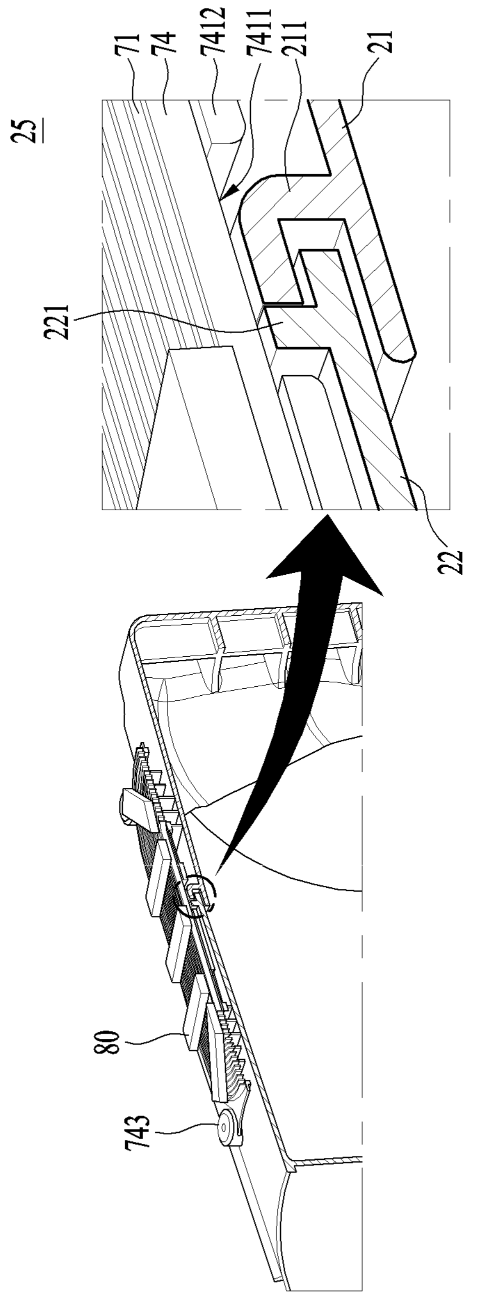
FIG. 21 is a view showing an embodiment of a connecting portion connecting a front tub and a rear tub and the coupling with a base housing.

The radially outer surface of the first coupling rib 211 and the radially outer surface of the second coupling rib 221 may have the same radius as each other. The radially-extending portion of the connecting portion in the above-described embodiment may be omitted. FIG. 21 shows an embodiment in which the protruding height of the connecting portion 25 is reduced. In this embodiment, the coupling area in the radial direction in the connecting portion 25 is reduced. This configuration may not be formed in the entire circumferential direction of the tub, but may be formed only in a portion of the connecting portion that corresponds to the module-mounting portion. The other portions of the connecting portion may be the same as those of the connecting portion in FIG. 20.

As described above, it is desirable that the induction module be formed only in a portion of the outer circumferential surface of the tub. That is, the length of the circumference on which the induction module is mounted is relatively short as compared with the whole length of the circumference of the tub. Accordingly, the radially-extending portion may be omitted from the connecting portion 25 that is located in the module-mounting portion on which the induction module is mounted. Therefore, the radially-extending portion may be omitted from the connecting portion 25 corresponding to this portion, and only a portion in which the rubber packing can be inserted may be provided therein.

The coupling force between the front tub 22 and the rear tub 21 may be formed by a bolt or a screw. That is, when the bolt or the screw is fastened in the connecting portion 25 in the forward-and-backward direction of the tub, the front tub 22 and the rear tub 21 may be tightly coupled to each other. The fastening position of the bolt or the screw may be provided in a plural number in the circumferential direction of the tub. As the fastening structure for the bolt or the screw, an extended connecting portion 25*a* may be provided. FIG. 18 shows an example in which a plurality of extended connecting portions 25*a* is formed in the circumferential direction of the tub.

The fastening of the bolt or the screw may be omitted from the connecting portion 25 located at the module-mounting portion, and the structure for such fastening may also be omitted.

This is because the connecting portion 25 is further extended in the radial direction by the structure for the fastening. Therefore, it is desirable that the configuration for generating the coupling force between the front tub and the rear tub be omitted from the connecting portion 25 corresponding to the module-mounting portion.

Figure 18:
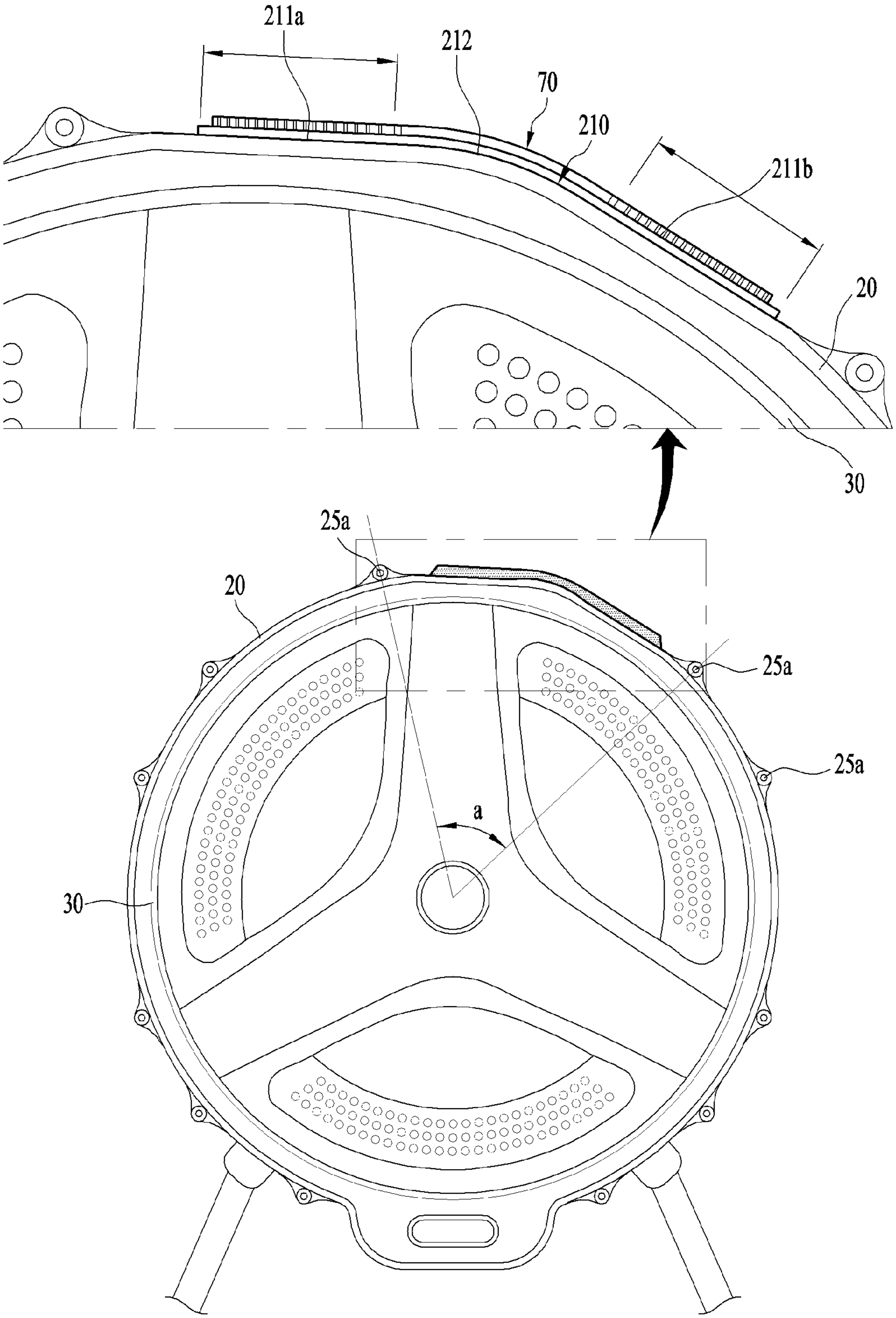
FIG. 18 is a cross-sectional view taken along line A-A' in FIG. 17.

As shown in FIG. 18, the extended connecting portion 25*a* is omitted from the module-mounting portion, and the angle $\alpha$ between the extended connecting portions 25*a*, which are located on both sides of the module-mounting portion, is about 50 degrees. This is for avoiding interference between the module-mounting portion and the extended connecting portions 25*a*. Further, as described above, this is for securing the straight region for the installation of the module-mounting portion. Alternatively, the angle between the extended connecting portions, which are located on both sides of the module-mounting portion, may be about 40 degrees, rather than 50 degrees.

However, it is not desirable to further increase the angle between the extended connecting portions in terms of coupling strength. Further, there is a limitation in further extending the lateral width of the induction module by the angle between the extended connecting portions. Furthermore, the extension of the lateral width of the induction module needs to be limited in terms of mounting convenience and mounting stability of the induction module and avoidance of interference with the extended connecting portions.

Meanwhile, in terms of the characteristics of the tub containing wash water therein and the load applied thereto, the coupling safety factor of the upper portion of the tub is lower than that of the lower portion of the tub. Therefore, considering the circumferential width of the induction module and the circumferential length of the tub and considering that the induction module is located at the upper portion of the tub, the configuration of the connecting portion 25 can sufficiently ensure reliability.

In the same manner, in this embodiment, it is also possible to form a penetration portion in the base housing 74 and to insert the connecting portion into the penetration portion. The distance between the induction module and the drum in this embodiment may be shorter than that in the above-described embodiment.

In the above-described embodiments, the distance between the coil and the outer circumferential surface of the drum is significantly reduced due to the shape of the module-mounting portion, the structure of the connecting portion located in the module-mounting portion, and the connection structure between the base housing and the module-mounting portion, thereby greatly enhancing efficiency.

The features of the above embodiments may be applied in combination with those of other embodiments unless the features are contradictory or mutually exclusive.

As is apparent from the above description, a laundry treatment apparatus according to an embodiment of the present invention is capable of improving efficiency and safety while using induction heating.

In addition, a laundry treatment apparatus according to an embodiment of the present invention is capable of realizing soaking treatment or sterilization treatment without completely immersing laundry in wash water.

In addition, a laundry treatment apparatus according to an embodiment of the present invention is capable of improving washing efficiency and drying laundry by increasing the temperature of the laundry by heating a drum without directly heating wash water.

In addition, a laundry treatment apparatus according to an embodiment of the present invention is capable of evenly drying all laundry, improving drying efficiency and shortening the drying time even when the laundry is tangled or even when the amount of laundry is large.

In addition, a laundry treatment apparatus according to an embodiment of the present invention is capable of preventing a short circuit in a coil, which is used to heat a drum, and preventing deformation of the coil.

In addition, a laundry treatment apparatus according to an embodiment of the present invention has a structure for cooling an overheated coil due to the inherent resistance thereof.

In addition, a laundry treatment apparatus according to an embodiment of the present invention is capable of improving heating efficiency by increasing a coil density (a ratio of the area of the coil to the area of a base housing on which the coil is mounted).

In addition, a laundry treatment apparatus according to an embodiment of the present invention is capable of preventing unexpected disengagement of constituent components of an induction module even when a tub vibrates by securing the coupling stability of the induction module.

In addition, a laundry treatment apparatus according to an embodiment of the present invention is capable of preventing the occurrence of noise attributable to a gap by securing the coupling stability of the induction module.

In addition, a laundry treatment apparatus according to an embodiment of the present invention is capable of improving drying efficiency by evenly heating the front and rear portions of a drum.

In addition, a laundry treatment apparatus according to an embodiment of the present invention is capable of improving heating efficiency by reducing the interval between a coil of an induction module and a drum and of more stably mounting the induction module on the outer circumferential surface of a tub.

It is included in the detailed description of the invention.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A laundry treatment apparatus comprising:

a cabinet that defines an external appearance of the laundry treatment apparatus;

a tub provided in the cabinet and having a cylindrical shape;

a drum that has the cylindrical shape, that is configured to rotate within the tub and to receive laundry therein, and that is made of a metallic material;

an induction module provided at an outer surface of the tub and configured to generate a magnetic field to heat the drum within the tub via induction; and a module-mounting portion located on the outer surface of the tub and comprising a flat region that is arranged radially closer to a rotational axis of the drum than a remaining portion of the outer surface of the tub, wherein the induction module comprises a coil, the coil comprising two horizontal straight portions, two vertical straight portions, and four curved portions disposed at four positions at which the horizontal straight portion and the vertical straight portion are connected, and wherein one of the two horizontal straight portions or the two vertical straight portions is arranged inside the flat region.

2. The laundry treatment apparatus according to claim 1, wherein the module-mounting portion is located at an upper portion of the tub.

3. The laundry treatment apparatus according to claim 2, wherein the tub comprises a front tub portion, a rear tub portion, and a connecting portion that connects the front tub portion to the rear tub portion and that is arranged along a circumferential direction of the tub, and wherein the module-mounting portion is arranged over the front tub portion, the connecting portion, and the rear tub portion.

4. The laundry treatment apparatus according to claim 3, wherein the induction module is arranged on a portion of the module-mounting portion that is positioned over a portion of the front tub portion, the connecting portion, and a portion of the rear tub portion.

5. The laundry treatment apparatus according to claim 1, wherein the flat region is disposed at a center of the module-mounting portion, and wherein the module-mounting portion further comprises:

a first connection region that connects a first end of the flat region of the module-mounting portion to the remaining portion of the outer surface of the tub; and a second connection region that connects a second end of the flat region of the module-mounting portion to the remaining portion of the outer surface of the tub.

6. The laundry treatment apparatus according to claim 5, wherein the coil is wound to define a hollow center portion and the hollow center portion is formed at a portion corresponding to a center of the flat region of the module-mounting portion.

7. The laundry treatment apparatus according to claim 1, wherein the flat region of the module-mounting portion comprises a first flat region and a second flat region, and wherein the module-mounting portion further comprises a connection region that is located between the first flat region and the second flat region and connects the first flat region and the second flat region, the connection region being curved or flat.

8. The laundry treatment apparatus according to claim 7, wherein the coil is wound to define a hollow center portion at a portion corresponding to the connection region.

9. The laundry treatment apparatus according to claim 7, wherein one of the two horizontal straight portions or the two vertical straight portions of the coil is arranged parallel to the first flat region or the second flat region.

10. The laundry treatment apparatus according to claim 1, wherein the flat region of the module-mounting portion is formed by depressing an outer circumferential surface of the tub.

11. The laundry treatment apparatus according to claim 1, wherein one of the two horizontal straight portions or the two vertical straight portions of the coil is arranged parallel to the flat region of the module-mounting portion.

12. The laundry treatment apparatus according to claim 1, wherein the flat region of the module-mounting portion and one of the two horizontal straight portions or the two vertical straight portions of the coil are arranged to overlap.

13. The laundry treatment apparatus according to claim 1, wherein the flat region of the module-mounting portion extends from a front side of the tub to a rear side of the tub, and wherein the module-mounting portion has a rectangular shape, a circular shape, a diamond shape, or an oblique rectangular shape.

* * * * *